(12) United States Patent
Cole et al.

(10) Patent No.: US 7,599,877 B1
(45) Date of Patent: Oct. 6, 2009

(54) METHODS AND SYSTEMS FOR COLLATERAL MATCHING AND MARK TO MARKET RECONCILEMENT

(75) Inventors: Alan Cole, Yardley, PA (US); Jon Cassell, Bishop's Stortford (GB)

(73) Assignee: Citibank, N.A., New York, NY (US)

( * ) Notice: Subject to any disclaimer, the term of this patent is extended or adjusted under 35 U.S.C. 154(b) by 1992 days.

(21) Appl. No.: 09/627,951

(22) Filed: Jul. 28, 2000

Related U.S. Application Data

(60) Provisional application No. 60/146,569, filed on Jul. 30, 1999.

(51) Int. Cl.
*G06Q 40/00* (2006.01)
(52) U.S. Cl. .......................................... 705/37
(58) Field of Classification Search ............... 705/36, 705/37, 36 R, 35
See application file for complete search history.

(56) References Cited

U.S. PATENT DOCUMENTS

| | | | | |
|---|---|---|---|---|
| 4,734,856 | A | * | 3/1988 | Davis ........................... 706/62 |
| 5,704,045 | A | | 12/1997 | King et al. ................... 395/235 |
| 5,802,499 | A | | 9/1998 | Sampson et al. .............. 705/35 |
| 5,926,792 | A | | 7/1999 | Koppes et al. ................. 705/4 |
| 5,970,479 | A | | 10/1999 | Shepherd ...................... 705/37 |
| 6,016,484 | A | * | 1/2000 | Williams et al. .............. 705/39 |
| 6,018,721 | A | | 1/2000 | Aziz et al. ..................... 705/35 |
| 6,205,452 | B1 | * | 3/2001 | Warmus et al. ............. 715/500 |

(Continued)

FOREIGN PATENT DOCUMENTS

EP  1 072 990 A2 * 7/2000
EP  0 644 513 A2   1/2001

(Continued)

OTHER PUBLICATIONS

Sungard ePI website page, intelliMatch Collateral Reconciliation, printed Feb. 25, 2004.*

(Continued)

*Primary Examiner*—Hani Kazimi
(74) *Attorney, Agent, or Firm*—George T. Marcou; King & Spalding LLP

(57) ABSTRACT

The present invention provides secure, high-volume, processing methods and systems for multiple financial instruments that combine collateral matching to identify matched and unmatched financial transactions and consolidated mark to market valuations for all parties to a matched financial transaction. Further, the methods and systems of the present invention: (1) provide real-time identification of matched and unmatched financial transactions; (2) provide real-time mark to market portfolio valuations; (3) provide standard formulae and user preferences to develop algorithms for real-time mark to market portfolio valuations; (4) accommodate additional financial instruments and additional users; (5) minimize manual review of discrepancies in margin valuations; (6) provide multilingual capabilities, settlement currencies, and other identifiers necessary to communicate the results of collateral matching and mark to market portfolio valuations; (7) facilitate lower financial transaction and processing costs; and (8) minimize the manual entry and re-keying of information into multiple formats and templates used parties to a financial transaction.

In other embodiments of the present invention, the methods and systems may be designed to: (1) utilize a user-friendly interactive user interface; (2) provide integration with external and internal systems; (3) provide detailed reports; (4) allow for real-time system modifications and system configuration; (5) allow for customized import/export files; and/or (6) utilize state-of-the-art communications technology.

28 Claims, 31 Drawing Sheets

U.S. PATENT DOCUMENTS

| | | | |
|---|---|---|---|
| 6,247,000 B1 * | 6/2001 | Hawkins et al. | 705/37 |
| 6,292,811 B1 * | 9/2001 | Clancey et al. | 715/503 |
| 6,385,602 B1 * | 5/2002 | Tso et al. | 707/3 |

FOREIGN PATENT DOCUMENTS

| | | | |
|---|---|---|---|
| JP | 2004086824 A | * | 3/2004 |
| JP | 0200412760 A | * | 4/2004 |
| WO | WO 98/58333 | * | 12/1998 |
| WO | WO 99/46710 | * | 9/1999 |

OTHER PUBLICATIONS

Business Wire, SunGard's intelliMatch EP Awarded SWIFT Ready Cold Label for Fourth Consecutive Year, Aug. 12, 2003, p. 5745 Aug. 12, 2003.*

"Lawyers Suggest Ignoring Derivative Financial Positions Under Interest Allocation Rules," 96 TNT 161-18, Aug. 16, 1996.

Stoaker, Christopher, "Making Collateral Secure," *Euromoney*, n. 323, p. 22, Mar. 1996.

Hart, David, "Managing the Credit Risk of Capital Market Products," *Journal of Commercial Lending*, vol. 77, No. 6, pp. 17-26, Feb. 1995.

Brown, Keith C. and Smith, Donald J., Default Risk and Innovations in the Design of Interest Rate Swaps, *Finanical Management*, vol. 22, No. 2, pp. 94-105, Summer 1993.

Lee, Peter, "How to Exorcise Your Derivatives Demons," *Euromoney Special Issue*, pp. 36-48, Sep. 1992.

Bensman, Miriam, "Getting Out Fast and Early: Even Triple-A Counterparties Might Go Bust Within the Life of A 10-Year Swap, So Some Swappers are Asking For Credit Puts. Should You?," *Futures*, vol. 22, No. 9, p. 22(2), Aug. 1993.

Schap, Keith, "When Domino Theory Meets OTC Credit Risk. (Over-The-Counter)," *Futures*, vol. 21, No. 10, p. 38(4), Aug. 1992.

"Collateral Damage," *Euromoney*, p. 38, Nov. 10, 1998.

Beder, Tanya Styblo, "Derivatives: The Realities of Marking to Model," *Bank Accounting & Finance*, vol. 7, No. 4, pp. 4-12, Summer 1994.

Duncan, John and Lewis, Douglas, "Managing the Greatest Risk of Derivatives Activities: Regulatory Overkill," *Bank Accounting & Finance*, vol. 7, No. 3, pp. 28-37, Spring 1994.

Friedman, Lauren A. and Joseph, Michael S., "A Blueprint for Controlling the Derivatives Business: Some Questions for Management," *Bank Accounting and Finance*, vol. 8, No. 3, pp. 21-33, Spring 1993.

* cited by examiner

Exposure Summary Report for Bank No. 1

Bank No. 2

| Matched | OURS | -21,590,096.77 |
|---|---|---|
| Unmatched | OURS | 42,804,687.18 |
| | Total | 21,214,590.41 |
| Matched | THEIRS | 24,548,818.00 |
| Unmatched | THEIRS | -65,830,582.00 |
| | Total | -41,281,764.00 |
| | NET | -20,067,173.59 |

Bank No. 3

| Matched | OURS | 28,698,177.31 |
|---|---|---|
| Unmatched | OURS | 20,611,853.19 |
| | Total | 49,310,030.50 |
| Matched | THEIRS | -35,761,533.08 |
| Unmatched | THEIRS | -4,059,325.65 |
| | Total | -39,820,858.73 |
| | NET | 9,489,171.77 |

FIG. 5

Data Table for Matched Financial Transactions

Matched Trades — Bank Name: Bank No. 1

| CP | TransactionID | Product | PayNotional | Cur | RecNotional | Cur | Trade Date |
|---|---|---|---|---|---|---|---|
| BANK1 | 039174024 | OTHER | 100,000,000 | DKK | -100,000,000 | DKK | 23-Jun-93 |
| BANK2 | LNSW022285 | OTHER | 100,000,000 | DKK | | | 23-Jun-93 |
| BANK1 | 0393288023 | OTHER | 25,000,000,000 | ITL | -25,000,000,000 | ITL | 15-Oct-93 |
| BANK2 | LNSW026045 | OTHER | 25,000,000,000 | ITL | | | 15-Oct-93 |
| BANK1 | 0394012035 | OTHER | 750,000,000 | FRF | -750,000,000 | FRF | 12-Jan-94 |
| BANK2 | LNSW028079 | OTHER | 750,000,000 | FRF | | | 12-Jan-94 |
| BANK1 | 0394014032 | OTHER | 100,000,000 | FRF | -100,000,000 | FRF | 03-Feb-94 |
| BANK2 | LNSW028815 | OTHER | 100,000,000 | FRF | | | 03-Feb-94 |
| BANK1 | 0394039053 | OTHER | 100,000,000 | DEM | -100,000,000 | DEM | 06-Feb-94 |
| BANK2 | LNSW028953 | OTHER | 100,000,000 | DEM | | | 06-Feb-94 |
| BANK1 | 0394041023 | OTHER | 50,000,000,000 | ITL | -50,000,000,000 | ITL | 10-Feb-94 |
| BANK2 | LNSW029057 | OTHER | 50,000,000,000 | ITL | | | 10-Feb-94 |
| BANK1 | 0394166099 | OTHER | 250,000,000 | SEK | -250,000,000 | SEK | 15-Jun-94 |
| BANK2 | LNSW032838 | OTHER | 250,000,000 | SEK | | | 15-Jun-94 |
| BANK1 | 0394200007 | OTHER | 100,000,000 | FRF | -100,000,000 | FRF | 19-Jul-94 |
| BANK2 | LNSW033803 | OTHER | 100,000,000 | FRF | | | 19-Jul-94 |
| BANK1 | 0394222026 | OTHER | 100,000,000 | FRF | -100,000,000 | FRF | 10-Aug-94 |
| BANK2 | LNSW034486 | OTHER | 100,000,000 | FRF | | | 10-Aug-94 |
| BANK1 | 0394245036 | OTHER | 100,000,000 | FRF | -100,000,000 | FRF | 02-Sep-94 |
| BANK2 | LNSW035149 | OTHER | 100,000,000 | FRF | | | 02-Sep-94 |
| BANK1 | 0394249101 | OTHER | 300,000,000 | FRF | -300,000,000 | FRF | 06-Sep-94 |
| BANK2 | LNSW035248 | OTHER | 300,000,000 | FRF | | | 06-Sep-94 |
| BANK1 | 0394259030 | OTHER | 200,000,000 | FRF | -200,000,000 | FRF | 16-Sep-94 |
| BANK2 | LNSW035578 | OTHER | 200,000,000 | FRF | | | 16-Sep-94 |
| BANK1 | 0394283029 | OTHER | 150,000,000 | SEK | -150,000,000 | SEK | 07-Sep-94 |
| BANK2 | LNSW003531 | OTHER | 150,000,000 | SEK | | | 07-Sep-94 |

FIG. 6A-1

Data Table for Matched Financial Transactions

Counterparty Name: Bank No. 2

| Start Date | Maturity | Settlement | B/S | MTM | MTMdate | Recon Matchno | Level |
|---|---|---|---|---|---|---|---|
| 23-Jun-93 | 23-Jun-98 | 23-Jun-98 | | -406,435.58 | 07-Jul-97 | No. 4411 | level3 |
| | 23-Jun-98 | | | 1,132,865.00 | | No. 4411 | level3 |
| 19-Oct-93 | 19-Oct-00 | 19-Oct-00 | | 1,485,344.27 | 07-Jul-97 | No. 4412 | level3 |
| | 19-Oct-00 | | | -1,345,884.00 | | No. 4412 | level3 |
| 13-Jan-94 | 13-Jan-99 | 13-Jan-99 | | 4,997,872.96 | 07-Jul-97 | No. 4413 | level3 |
| | 13-Jan-99 | | | -4,898,807.00 | | No. 4413 | level3 |
| 04-Feb-94 | 04-Feb-98 | 04-Feb-98 | | -441,474.27 | 07-Jul-97 | No. 4414 | level3 |
| | 04-Feb-98 | | | 440,713.00 | | No. 4414 | level3 |
| 10-Feb-94 | 10-Feb-04 | 10-Feb-99 | | 4,583,895.29 | 07-Jul-97 | No. 4415 | level3 |
| | 10-Feb-04 | | | -3,779,613.00 | | No. 4415 | level3 |
| 14-Feb-94 | 16-Feb-98 | 16-Feb-98 | | -237,450.68 | 07-Jul-97 | No. 4416 | level3 |
| | 14-Feb-98 | | | 227,029.00 | | No. 4416 | level3 |
| 17-Jun-94 | 17-Jun-99 | 17-Jun-99 | | -3,174,099.87 | 07-Jul-97 | No. 4417 | level3 |
| | 17-Jun-99 | | | 3,091,420.00 | | No. 4417 | level3 |
| 20-Jul-94 | 20-Jul-99 | 20-Jul-99 | | 2,030,254.62 | 07-Jul-97 | No. 4418 | level3 |
| | 20-Jul-99 | | | -2,009,451.00 | | No. 4418 | level3 |
| 11-Aug-94 | 11-Aug-98 | 11-Aug-98 | | -1,655,686.43 | 07-Jul-97 | No. 4419 | level3 |
| | 11-Aug-98 | | | 1,660,983.00 | | No. 4419 | level3 |
| 05-Sep-94 | 07-Sep-98 | 07-Sep-98 | | -1,742,200.22 | 07-Jul-97 | No. 4420 | level3 |
| | 07-Sep-98 | | | 1,748,118.00 | | No. 4420 | level3 |
| 07-Sep-94 | 08-Sep-97 | 08-Sep-97 | | 3,307,560.14 | 07-Jul-97 | No. 4421 | level3 |
| | 08-Sep-97 | | | -3,336,993.00 | | No. 4421 | level3 |
| 19-Sep-94 | 20-Sep-94 | 21-Sep-98 | | -4,979,641.58 | 07-Jul-97 | No. 4422 | level3 |
| | 20-Sep-99 | | | 4,936,722.00 | | No. 4422 | level3 |
| 09-Sep-94 | 09-Sep-97 | 09-Sep-97 | | 2,004,392.94 | 07-Jul-97 | No. 4423 | level3 |
| | 09-Sep-97 | | | -1,994,031.00 | | No. 4423 | level3 |

FIG. 6A-2

Data Table for Matched Financial Transactions

Matched Trades — Bank Name: Bank No. 1

| CP | TransactionID | Product | PayNotional | Cur | RecNotional | Cur | Trade Date |
|---|---|---|---|---|---|---|---|
| BANK1 | Z72918 | OTHER | -150,000,000 | CHF | 150,000,000 | CHF | 04-Oct-96 |
| BANK2 | 187177 | OTHER | 150,000,000 | CHF | | | 04-Oct-96 |
| BANK1 | Z76373 | OTHER | 200,000,000 | DEM | 0 | DEM | 01-Mar-95 |
| BANK2 | LNCF186496 | OTHER | 200,000,000 | DEM | | | 01-Mar-95 |
| BANK1 | ZC0199940706 | OTHER | -8,000,000,000 | JPY | 8,000,000,000 | JPY | 06-Jul-94 |
| BANK2 | TKSW013832 | OTHER | 8,000,000,000 | JPY | | | 06-Jul-94 |
| BANK1 | ZC019950413 | OTHER | -3,000,000,000 | JPY | 3,000,000,000 | JPY | 12-Apr-95 |
| BANK2 | TKSW017253 | OTHER | 3,000,000,000 | JPY | | | 12-Apr-95 |
| BANK1 | ZC019950417 | OTHER | -3,000,000,000 | JPY | 3,000,000,000 | JPY | 11-Apr-95 |
| BANK2 | TKSW017222 | OTHER | 3,000,000,000 | JPY | | | 11-Apr-95 |
| BANK1 | ZC019960329 | OTHER | -4,000,000,000 | JPY | 4,000,000,000 | JPY | 29-Mar-96 |
| BANK2 | TKSW025931 | OTHER | 4,000,000,000 | JPY | | | 29-Mar-96 |

Number of Records: 220

FIG. 6B-1

Data Table for Matched Financial Transactions

Counterparty Name: Bank No. 2

| Start Date | Maturity | Settlement | B/S | MTM | MTMdate | Recon Matchno | Level |
|---|---|---|---|---|---|---|---|
| 04-Oct-96 | 07-Oct-99 | 07-Oct-99 | | -1,631,096.48 | 07-Jul-97 | No. 4515 | level3 |
| | 07-Oct-99 | | | 1,541,463.00 | | No. 4515 | level3 |
| 04-Sep-95 | 03-Mar-98 | 03-Mar-98 | | 0.00 | 07-Jul-97 | No. 4516 | level3 |
| | 03-Mar-98 | | | -6,035.00 | | No. 4516 | level3 |
| 08-Jul-94 | 08-Jul-98 | 08-Jul-98 | | -3,526,610.03 | 07-Jul-97 | No. 4517 | level3 |
| | 08-Jul-98 | | | 3,446,612.00 | | No. 4517 | level3 |
| 18-Apr-95 | 19-Apr-99 | 19-Apr-99 | | -973,932.20 | 07-Jul-97 | No. 4518 | level3 |
| | 18-Apr-99 | | | 918,014.00 | | No. 4518 | level3 |
| 13-Apr-95 | 14-Apr-98 | 14-Apr-98 | | -460,590.41 | 07-Jul-97 | No. 4519 | level3 |
| | 14-Apr-98 | | | 445,550.00 | | No. 4519 | level3 |
| 02-Apr-96 | 02-Apr-03 | 02-Apr-03 | | -2,149,647.90 | 07-Jul-97 | No. 4520 | level3 |
| | 02-Apr-03 | | | 1,878,968.00 | | No. 4520 | level3 |
| | | | Sum of MTM = | 2958721.23 | | | |

FIG. 6B-2

Data Table for Matched Financial Transactions

Matched Trades — Bank Name: Bank No. 1

| CP | TransactionID | Product | PayNotional | Cur | RecNotional | Cur | Trade Date |
|---|---|---|---|---|---|---|---|
| BANK1 | 389300002 | OTHER | 20,000,000 | DEM | -20,000,000 | DEM | 27-Oct-89 |
| BANK3 | 3723100 | OTHER | 20,000,000 | DEM | 20,000,000 | DEM | 08-Nov-91 |
| BANK1 | 390183004 | OTHER | 15,000,000 | DEM | -15,000,000 | DEM | 02-Jul-90 |
| BANK3 | 3721800 | OTHER | 15,000,000 | DEM | 15,000,000 | DEM | 02-Jul-90 |
| BANK1 | 392022006 | OTHER | 10,000,000 | CHF | -10,000,000 | CHF | 22-Jan-92 |
| BANK3 | 5209100 | OTHER | 10,000,000 | CHF | 10,000,000 | CHF | 22-Jan-92 |
| BANK1 | 392204011 | OTHER | 50,000,000 | USD | -50,000,000 | USD | 22-Jul-92 |
| BANK3 | 417400 | OTHER | 50,000,000 | USD | 50,000,000 | USD | 22-Jul-92 |
| BANK1 | 392269014 | OTHER | 5,000,000 | GBP | -5,000,000 | GBP | 25-Sep-92 |
| BANK3 | 7893900 | OTHER | 5,000,000 | GBP | 5,000,000 | GBP | 25-Sep-92 |
| BANK1 | 393011022 | OTHER | 50,000,000,000 | ITL | -50,000,000,000 | ITL | 11-Jan-93 |
| BANK3 | 4742600 | OTHER | 50,000,000,000 | ITL | 50,000,000,000 | ITL | 11-Jan-93 |
| BANK1 | 393025002 | OTHER | 10,000,000 | CHF | -10,000,000 | CHF | 25-Jan-93 |
| BANK3 | 5224300 | OTHER | 10,000,000 | CHF | 10,000,000 | CHF | 14-Feb-94 |
| BANK1 | 393188013 | OTHER | 10,000,000 | GBP | -10,000,000 | GBP | 07-Jul-93 |
| BANK3 | 7983200 | OTHER | 10,000,000 | GBP | 10,000,000 | GBP | 07-Jul-93 |
| BANK1 | 393259014 | OTHER | 20,000,000 | GBP | -20,000,000 | GBP | 16-Sep-93 |
| BANK3 | 8011300 | OTHER | 20,000,000 | GBP | 20,000,000 | GBP | 16-Sep-93 |
| BANK1 | 394096034 | OTHER | 10,000,000 | GBP | -10,000,000 | GBP | 06-Apr-94 |
| BANK3 | 8166500 | OTHER | 10,000,000 | GBP | 10,000,000 | GBP | 06-Apr-94 |
| BANK1 | 394194014 | OTHER | 25,000,000 | GBP | -25,000,000 | GBP | 12-Jul-94 |
| BANK3 | 8242600 | OTHER | 25,000,000 | GBP | 25,000,000 | GBP | 12-Jul-94 |
| BANK1 | 394195028 | OTHER | 10,000,000 | GBP | -10,000,000 | GBP | 14-Jul-94 |
| BANK3 | 8246800 | OTHER | 10,000,000 | GBP | 10,000,000 | GBP | 14-Jul-94 |
| BANK1 | 394213014 | OTHER | 20,000,000 | GBP | -20,000,000 | GBP | 01-Aug-94 |
| BANK3 | 8258100 | OTHER | 20,000,000 | GBP | 20,000,000 | GBP | 01-Aug-94 |

FIG. 6C-1

Data Table for Matched Financial Transactions

| | Counterparty Name: Bank No. 3 | | | | | | |
|---|---|---|---|---|---|---|---|
| Start Date | Maturity | Settlement | B/S | MTM | MTMdate | Recon Matchno | Level |
| 31-Oct-89 | 30-Oct-98 | 30-Oct-98 | | -1,112,029.00 | | No. 4261 | level1 |
| 30-Oct-90 | 30-Oct-98 | | B | 1,118,561.80 | 07-Jul-97 | No. 4261 | level1 |
| 05-Jul-90 | 05-Jul-00 | 05-Jul-00 | | -1,806,968.00 | | No. 4262 | level1 |
| 05-Jul-90 | 05-Jul-00 | | B | 1,194,819.30 | 07-Jul-97 | No. 4262 | level1 |
| 24-Jan-92 | 26-Jan-98 | 26-Jan-98 | | 352,298.10 | | No. 4263 | level1 |
| 24-Jan-92 | 24-Jan-98 | | S | -348,805.47 | 07-Jul-97 | No. 4263 | level1 |
| 24-Jul-92 | 24-Jul-97 | 24-Jul-97 | | 89,463.58 | | No. 4264 | level1 |
| 24-Jul-92 | 24-Jul-97 | | S | -89,718.82 | 07-Jul-97 | No. 4264 | level1 |
| 25-Sep-92 | 27-Sep-99 | 27-Sep-99 | | 333,328.40 | | No. 4265 | level1 |
| 25-Sep-92 | 25-Sep-99 | | S | -326,909.41 | 07-Jul-97 | No. 4265 | level1 |
| 13-Jan-93 | 13-Jan-98 | 13-Jan-98 | | 1,568,930.00 | | No. 4266 | level1 |
| 13-Jan-93 | 13-Jan-98 | | S | -1,572,849.50 | 07-Jul-97 | No. 4266 | level1 |
| 27-Jan-93 | 27-Nov-00 | 27-Nov-00 | | 935,720.60 | | No. 4267 | level1 |
| 25-Nov-93 | 25-Nov-00 | | S | -940,591.77 | 07-Jul-97 | No. 4267 | level1 |
| 07-Jul-95 | 07-Jul-00 | 07-Jul-00 | | 487,275.50 | | No. 4268 | level1 |
| 07-Jul-95 | 07-Jul-00 | | S | -338,862.32 | 07-Jul-97 | No. 4268 | level1 |
| 16-Sep-93 | 18-Sep-00 | 18-Sep-00 | | -190,391.00 | | No. 4269 | level1 |
| 16-Sep-93 | 16-Sep-00 | | S | 247,927.06 | 07-Jul-97 | No. 4269 | level1 |
| 06-Apr-94 | 06-Apr-98 | 06-Apr-98 | | -73,311.30 | | No. 4270 | level1 |
| 06-Apr-94 | 06-Apr-98 | | B | 60,098.29 | 07-Jul-97 | No. 4270 | level1 |
| 12-Jul-94 | 12-Jul-99 | 12-Jul-99 | | -1,102,465.00 | | No. 4271 | level1 |
| 12-Jul-94 | 12-Jul-99 | | B | 1,033,623.70 | 07-Jul-97 | No. 4271 | level1 |
| 14-Jul-94 | 14-Jul-99 | 14-Jul-99 | | -380,249.00 | | No. 4272 | level1 |
| 14-Jul-94 | 14-Jul-99 | | B | 351,312.71 | 07-Jul-97 | No. 4272 | level1 |
| 01-Aug-94 | 03-Aug-98 | 03-Aug-98 | | -698,688.00 | | No. 4273 | level1 |
| 01-Aug-94 | 01-Aug-98 | | B | 655,572.61 | 07-Jul-97 | No. 4273 | level1 |

FIG. 6C-2

Data Table for Matched Financial Transactions

Bank Name: Bank No. 1

Matched Trades

| CP | TransactionID | Product | PayNotional | Cur | RecNotional | Cur | Trade Date |
|---|---|---|---|---|---|---|---|
| BANK1 | 396215054 | OTHER | 100,000,000 | FRF | -100,000,000 | FRF | 05-Sep-95 |
| BANK3 | 2924200 | OTHER | 100,000,000 | FRF | 100,000,000 | FRF | 16-Jun-94 |
| BANK1 | 396215071 | OTHER | 20,000,000 | GBP | -20,000,000 | GBP | 10-Dec-92 |
| BANK3 | 10778600 | OTHER | 20,000,000 | GBP | 20,000,000 | GBP | 25-Feb-97 |
| BANK1 | 396215074 | OTHER | 5,000,000 | GBP | -5,000,000 | GBP | 13-Nov-92 |
| BANK3 | 8010900 | OTHER | 5,000,000 | GBP | 5,000,000 | GBP | 16-Sep-93 |
| BANK1 | Z71508 | OTHER | 100,000,000 | DEM | 100,000,000 | DEM | 31-Aug-95 |
| BANK3 | T00511764 | OTHER | 100,000,000 | DEM | 100,000,000 | DEM | 29-May-97 |
| BANK1 | Z71520 | OTHER | 100,000,000 | GBP | 100,000,000 | GBP | 12-Mar-96 |
| BANK3 | 12704201 | OTHER | 100,000,000 | GBP | 100,000,000 | GBP | 30-Apr-97 |

Number of Records: 296

FIG. 6D-1

Data Table for Matched Financial Transactions

Counterparty Name: Bank No. 3

| Start Date | Maturity | Settlement | B/S | MTM | MTMdate | Recon Matchno | Level |
|---|---|---|---|---|---|---|---|
| 06-Sep-95 | 06-Sep-00 | 06-Sep-00 | | -2,162,625.00 | | No. 4405 | level2 |
| 17-Jun-94 | 17-Jun-98 | | B | 603,672.20 | 07-Jul-97 | No. 4405 | level2 |
| 10-Dec-92 | 10-Dec-97 | 10-Dec-97 | | 180,899.60 | | No. 4406 | level2 |
| 25-Feb-97 | 25-Feb-03 | | B | -160,635.67 | 07-Jul-97 | No. 4406 | level2 |
| 13-Nov-92 | 13-Nov-97 | 13-Nov-97 | | 24,665.45 | | No. 4407 | level2 |
| 16-Sep-93 | 16-Sep-98 | | S | 26,895.32 | 07-Jul-97 | No. 4407 | level2 |
| 31-Aug-95 | 02-Sep-05 | 29-Aug-97 | | 3,764,268.00 | | No. 4408 | level2 |
| 02-Jun-97 | 02-Jun-98 | | S | 231,182.88 | 07-Jul-97 | No. 4408 | level2 |
| 12-Jun-96 | 12-Mar-98 | 12-Mar-98 | | 144,978.00 | | No. 4409 | level2 |
| 30-Apr-97 | 31-Oct-97 | | B | 1,588,514.40 | 07-Jul-97 | No. 4409 | level2 |
| | | | Sum of MTM = | -7063355.7712 | | | |

FIG. 6D-2

Data Table for Unmatched Financial Transactions

*Unmatched Trades*      Bank Name: Bank No. 1

| TransactionID | Product | Notional 1 | Cur1 | Notional 2 | Cur2 | Trade Date |
|---|---|---|---|---|---|---|
| 0497168013 | OTHER | -300,000,000 | CZK | 300,000,000 | CZK | 17-Jun-97 |
| 0497161017 | OTHER | -200,000,000 | CZK | 200,000,000 | CZK | 22-May-97 |
| 0497153004 | OTHER | -200,000,000 | CZK | 200,000,000 | CZK | 02-Jun-97 |
| 0497150041 | OTHER | -200,000,000 | CZK | 200,000,000 | CZK | 22-May-97 |
| 0497188004 | OTHER | -200,000,000 | CZK | 200,000,000 | CZK | 07-Jul-97 |
| 0497188027 | OTHER | -200,000,000 | CZK | 200,000,000 | CZK | 07-Jul-97 |
| 0497157035 | OTHER | -200,000,000 | CZK | 200,000,000 | CZK | 06-Jun-97 |
| 0497160034 | OTHER | -200,000,000 | CZK | 200,000,000 | CZK | 09-Jun-97 |
| 0497162024 | OTHER | -100,000,000 | CZK | 100,000,000 | CZK | 11-Jun-97 |
| 0497160040 | OTHER | 100,000,000 | CZK | 0 | CZK | 09-Jun-97 |
| 0397171035 | OTHER | 100,000,000 | CZK | -100,000,000 | CZK | 20-Jun-97 |
| 0497156019 | OTHER | 200,000,000 | CZK | 0 | CZK | 05-Jun-97 |
| 0497150040 | OTHER | 200,000,000 | CZK | 0 | CZK | 29-May-97 |
| 0497163003 | OTHER | 200,000,000 | CZK | 0 | CZK | 12-Jun-97 |
| 0497170005 | OTHER | 200,000,000 | CZK | 0 | CZK | 19-Jun-97 |
| 0397171031 | OTHER | 200,000,000 | CZK | -200,000,000 | CZK | 19-Jun-97 |
| 0497170021 | OTHER | 200,000,000 | CZK | 0 | CZK | 19-Jun-97 |
| 0497188006 | OTHER | 300,000,000 | CZK | 0 | CZK | 07-Jul-97 |
| 0397183056 | OTHER | 300,000,000 | CZK | -300,000,000 | CZK | 02-Jul-97 |
| 0497175020 | OTHER | 300,000,000 | CZK | 0 | CZK | 24-Jun-97 |
| 0497182001 | OTHER | 300,000,000 | CZK | 0 | CZK | 01-Jul-97 |
| 0497177039 | OTHER | 300,000,000 | CZK | 0 | CZK | 26-Jun-97 |
| 0397160005 | OTHER | 500,000,000 | CZK | -500,000,000 | CZK | 06-Jun-97 |
| 0497156038 | OTHER | 500,000,000 | CZK | 0 | CZK | 05-Jun-97 |
| Z71088 | OTHER | -100,000,000 | DEM | 100,000,000 | DEM | 07-Aug-95 |
| Z71085 | OTHER | -25,000,000 | DEM | 25,000,000 | DEM | 23-Jun-95 |
| 0396347050 | OTHER | 8,000,000 | DEM | -8,000,000 | DEM | 11-Dec-96 |

FIG. 7A

Data Table for Unmatched Financial Transactions

Counterparty Name: Bank No. 2

| Start Date | Maturity | Settlement | B/S | Strike | MTM | Created | Updated |
|---|---|---|---|---|---|---|---|
| 19-Aug-97 | 19-Nov-97 | 19-Aug-97 | | 3019 | 8,332 | 25-Jul-97 | 25-Jul-97 |
| 26-Aug-97 | 26-Nov-97 | 26-aug-97 | | 3019 | 36,193 | 25-Jul-97 | 25-Jul-97 |
| 04-Dec-97 | 04-Jun-98 | 04-Dec-97 | | 3019 | 41,587 | 25-Jul-97 | 25-Jul-97 |
| 26-Aug-97 | 26-Nov-97 | 26-Aug-97 | | 3019 | 39,155 | 25-Jul-97 | 25-Jul-97 |
| 17-Sep-97 | 17-Dec-97 | 17-Sep-97 | | 3019 | 2,262 | 25-Jul-97 | 25-Jul-97 |
| 09-Jan-98 | 09-Apr-98 | 09-Jan-98 | | 3019 | 688 | 25-Jul-97 | 25-Jul-97 |
| 10-Dec-97 | 10-Jun-98 | 10-Dec-97 | | 3019 | 31,595 | 25-Jul-97 | 25-Jul-97 |
| 11-Aug-97 | 11-Feb-98 | 11-Aug-97 | | 3019 | -4,240 | 25-Jul-97 | 25-Jul-97 |
| 15-Sep-97 | 15-Dec-97 | 15-Sep-97 | | 3019 | 8,345 | 25-Jul-97 | 25-Jul-97 |
| 11-Aug-97 | 11-Nov-97 | 11-Aug-97 | | 3105 | 1,313 | 25-Jul-97 | 25-Jul-97 |
| 24-Jun-97 | 24-Jun-98 | 24-Jun-98 | | 3011 | -2,700 | 25-Jul-97 | 25-Jul-97 |
| 09-Sep-97 | 09-Dec-97 | 09-Sep-97 | | 3105 | -22,544 | 25-Jul-97 | 25-Jul-97 |
| 22-Aug-97 | 24-Nov-97 | 22-Aug-97 | | 3105 | -21,675 | 25-Jul-97 | 25-Jul-97 |
| 16-Sep-97 | 16-Mar-98 | 16-Sep-97 | | 3105 | -32,883 | 25-Jul-97 | 25-Jul-97 |
| 23-Dec-97 | 23-Mar-98 | 23-Dec-97 | | 3105 | -5,398 | 25-Jul-97 | 25-Jul-97 |
| 23-Jun-97 | 23-Jun-98 | 23-Jun-98 | | 3012 | 21,237 | 25-Jul-97 | 25-Jul-97 |
| 23-Jan-98 | 23-Apr-98 | 23-Jan-98 | | 3105 | -2,652 | 25-Jul-97 | 25-Jul-97 |
| 17-Dec-97 | 18-Mar-98 | 17-Dec-97 | | 3105 | -372 | 25-Jul-97 | 25-Jul-97 |
| 04-Jul-97 | 06-Jul-98 | 06-Jul-98 | | 3012 | 555 | 25-Jul-97 | 25-Jul-97 |
| 26-Sep-97 | 29-Dec-97 | 26-Sep-97 | | 3105 | -8,864 | 25-Jul-97 | 25-Jul-97 |
| 03-Oct-97 | 05-Jan-98 | 03-Oct-97 | | 3105 | 6,630 | 25-Jul-97 | 25-Jul-97 |
| 31-Dec-97 | 30-Jun-98 | 31-Dec-97 | | 3105 | 3,938 | 25-Jul-97 | 25-Jul-97 |
| 10-Jun-97 | 10-Jun-98 | 10-Jun-98 | | 3012 | 79,987 | 25-Jul-97 | 25-Jul-97 |
| 09-Sep-97 | 09-Dec-97 | 09-Sep-97 | | 3105 | -51,989 | 25-Jul-97 | 25-Jul-97 |
| 07-Aug-95 | 11-Aug-05 | 07-Aug-98 | | 3146 | -2,199 | 25-Jul-97 | 25-Jul-97 |
| 23-Jun-95 | 27-Jun-05 | 23-Jun-00 | | 3146 | -47,759 | 25-Jul-97 | 25-Jul-97 |
| 16-Dec-96 | 15-Oct-02 | 16-Dec-99 | | 3011 | 824,938 | 25-Jul-97 | 25-Jul-97 |

FIG. 7B

Data Table for Expired Financial Transactions

Bank Name: Bank No. 1

Expired Trades

| TransactionID | Product | Notional 1 | Cur1 | Notional 2 | Cur2 | Trade Date |
|---|---|---|---|---|---|---|
| 92B57 | OTHER | -50,000,000 | USD | 0 | USD | 16-Jul-92 |
| E58059 | OTHER | 51,812,500 | USD | 51,812,500 | USD | 16-Apr-96 |
| 0397100019 | OTHER | 500,000,000 | USD | -500,000,000 | USD | 10-Apr-97 |

Number of Records: 3

| | | | | | | |
|---|---|---|---|---|---|---|
| 395177080 | OTHER | 100,000,000 | DKK | -100,000,000 | DKK | 23-Jun-95 |
| 396191040 | OTHER | 1,000,000,000 | ESP | -1,000,000,000 | ESP | 09-Jul-96 |
| 396173034 | OTHER | 1,800,000,000 | ESP | -1,800,000,000 | ESP | 21-Jun-96 |

Number of Records: 3

FIG. 8A.

Data Table for Expired Financial Transactions

Counterparty Name: Bank No. 2    *24-Jul-97*

| Start Date | Maturity | Settlement | B/S | Strike | MTM | Created | Updated |
|---|---|---|---|---|---|---|---|
| 23-Jul-93 | 23-Jul-97 | 23-Jul-97 | | 0 | 0 | 24-Jul-97 | 24-Jul-97 |
| 16-Apr-96 | 11-Jul-97 | 11-Jul-97 | | 0 | 32,824,472 | 24-Jul-97 | 24-Jul-97 |
| 14-Apr-97 | 14-Jul-97 | 14-Jul-97 | | 3012 | -5,075,231 | 24-Jul-97 | 24-Jul-97 |
| | | | Total MTM = | | 27749240.65 | | |
| 23-Jun-95 | 23-Jun-97 | 23-Jun-97 | | 0 | -824,012 | 24-Jul-97 | 24-Jul-97 |
| 11-Jul-96 | 11-Jul-97 | 11-Jul-97 | | 0 | 401,965 | 24-Jul-97 | 24-Jul-97 |
| 25-Jun-96 | 25-Jun-97 | 25-Jun-97 | | 0 | 723,919 | 24-Jul-97 | 24-Jul-97 |
| | | | Total MTM = | | 301871.7 | | |

FIG. 8B

Import Errors Bank No. 2

| BANK2 | c:/derivs/imports/bank2.tab | AT LINE: | 135 |
|---|---|---|---|
| No data for required field Field [deal req] value [] | | | |
| NY5006-5987500-USD-25/02/97-25/08/97-0-0 | | | |

| BANK2 | c:/derivs/imports/bank2.tab | AT LINE: | 109 |
|---|---|---|---|
| No data for required field Field [deal req] value [] | | | |
| N0000282780-100000000-USD-08/09/93-10/09/97-0-0 | | | |

| BANK2 | c:/derivs/imports/bank2.tab | AT LINE: | 107 |
|---|---|---|---|
| No data for required field Field [deal req] value [] | | | |
| N0000205090-50000000-USD-21/07/92-23/07/97-0-0 | | | |

| BANK2 | c:/derivs/imports/bank2.tab | AT LINE: | 104 |
|---|---|---|---|
| No data for required field Field [deal req] value [] | | | |
| N00000659866-40000000-USD-18/04/91-17/12/97-0-0 | | | |

| BANK2 | c:/derivs/imports/bank2.tab | AT LINE: | 103 |
|---|---|---|---|
| No data for required field Field [deal req] value [] | | | |
| N00000659857-17000000-USD-18/04/91-17/12/97-0-0 | | | |

| BANK2 | c:/derivs/imports/bank2.tab | AT LINE: | 16 |
|---|---|---|---|
| No data for required field Field [deal req] value [] | | | |
| LNCF186496-200000000-DEM-01/03/95-03/03/98-0-0 | | | |

| BANK2 | c:/derivs/imports/bank2.tab | AT LINE: | 13 |
|---|---|---|---|
| No data for required field Field [deal req] value [] | | | |
| L000013233-25000000-GBP-04/11/94-04/11/97-0-0 | | | |

| BANK2 | c:/derivs/imports/bank2.tab | AT LINE: | 12 |
|---|---|---|---|
| No data for required field Field [notional 1] value [] | | | |
| FRA-USD-CITI-0-USD-18/12/96-18/12/99-196933-0 | | | |

| BANK2 | c:/derivs/imports/bank2.tab | AT LINE: | 11 |
|---|---|---|---|
| No data for required field Field [notional 1] value [] | | | |
| COM010082-0-USD-06/06/97-06/06/00-144019-0 | | | |

FIG. 9

International Swap Dealer Association (ISDA) Agreement Matrix

| | Products | XMARUS30AA1 | MGTCUS33XXX | TSCOGB22AA1 |
|---|---|---|---|---|
| XMARUS30AA1 | IRS, XCY | XX | ISDA87 | ISDA92 |
| | | XX | 19880621 | 19930101 |
| | | XX | A | A |
| | FRA | XX | BBAIR | |
| | | XX | 19871201 | |
| | | XX | A | |
| MGTCUS33XXX | | ISDA87 | XX | ISDA92 |
| | | 19880621 | XX | 19960505 |
| | | B | XX | A |
| | | BBAIR | XX | BBAIR |
| | | 19871201 | XX | 19871201 |
| | | A | XX | A |
| TSCOGB22AA1 | | ISDA92 | ISDA92 | XX |
| | | 19930101 | 19950101 | XX |
| | | B | B | XX |

FIG. 10

Sample Input Data Files

```
Tab delimited – BANK1E
GB600890000l464           41172.      BANK3        1494313022  EQ INDEX OPTIONS           3359
B          GBP                        09/11/94 09/11/99                     19400000
           31957618 8905499           3880  5817574 14723073 0 92
GB6008900001464           41172       BANK3                    1497135190  EQ INDEX OPTIONS  3386
S          ITL                        15/05/97 20/06/97                    -17603500000
           10416396       0                  0        0
           17603.5                    18/07/97
GB6008900001464           41172       BANK3                    1497170392  EQ INDEX OPTIONS  3387
B          ITL                        19/06/97                              19866000000
           11755169 264581.8 19866    822861.9 1087444  0.48
GB6008900001464           80027725754              BANK3     LONDON  (SWAP)      389300002
SWAP SING  3012                              DEM   27/10/89  30/10/98  31/10/89  30/10/98
           20000000      -200000000 11594203 -1112029       DEM     142920.2   0
GB6008900001464           80027725754              BANK3     LONDON  (SWAP)      390183004
SWAP SING  3012                              DEM   02/07/90  05/07/00  05/07/90  05/07/00
           15000000      -150000000 8695652  -1806968               281333.4    0
GB6008900001464           80027725754              BANK3     LONDON  (SWAP)      392022006
SWAP SING  3011                              CHF   22/01/92  26/01/98  24/01/92  26/01/98
           10000000      -100000000 6959911   352298.1       CHF   32191.75    384489.8
```

FIG. 11A

Sample Input Data Files

Fix Format – BANK1N
1195SW12  0393174024  EUROP          NY BANK2          COMPANY  CTS  0100042228
0000616303 BANK2 COMPANY – N EUROP 8000886971  -100000000.0014997226.00  -406435.58 07-JUL-97  06/23/1993
DKK DKK    100000000.00
06/23/1998
1195SW12  0393288023  EUROP          NY BANK2          COMPANY  CTS  0100042228
0000616303 BANK2 COMPANY LO EUROP 8000803804                                 14651930.54 1485344.27 07/JUL-97  10/15/1993  10/19/1993
ITL ITL    2500000000000.00          -250000000000.00
10/19/2000
1195SW12  0394012035  EUROP          NY BANK2          COMPANY  CTS  0100042228
0000616303 BANK2 COMPANY LO EUROP 8000803804                                 1270026066.18 4997872.96 07-JUL-97  01/12/1994  01/13/1994
FRF FRF    750000000.00              -750000000.00
01/13/1999
1195SW12  0394034032  EUROP          NY BANK2          COMPANY  CTS  0100042228
0000616303 BANK2 COMPANY – N EUROP 8000886971                                1936808.82  -441474.27 07-JUL-97  02/03/1994  2/04/1994
FRF FRF    100000000.00              -100000000.00
02/04/1998
1195SW12  0394039053  EUROP          NY BANK2          COMPANY  CTS  0100042228
0000616303 BANK2 COMPANY LO EUROP 8000803804                                 458895.29  07-JUL-97 02/08/1994  02/10/1994
DEM DEM    100000000.00              -100000000.00  57110220.19
02/10/1999  02/10/1994

FIG. 11B

Sample Input Data Files

Tab Delimited with headings – BANK2

| Transaction ID | Notional | Ccy | Transaction Date | | Maturity Date | DEAL REC | INITIAL REC |
|---|---|---|---|---|---|---|---|
| 44513 | 10000000000 | JPY | 14/11/95 | 15/11/99 | 212820 | 0 | |
| 44514 | 10000000000 | JPY | 14/11/95 | 15/11/99 | 5059420 | 0 | |
| 18163 | 100000000 | CHF | 02/10/96 | 06/10/99 | 1430964 | 0 | |
| 186644 | 25000000 | DEM | 23/06/95 | 23/06/00 | 67183 | 0 | |
| 186704 | 100000000 | DEM | 07/09/95 | 07/08/99 | 3153 | 0 | |
| 187152 | 100000000 | DEM | 23/09/96 | 13/02/98 | -4155335 | 0 | |
| 187171 | 100000000 | CHF | 03/10/96 | 07/10/99 | 1294263 | 0 | |
| 187177 | 150000000 | CHF | 04/10/96 | 07/10/99 | 1541463 | 0 | |
| 187194 | 200000000 | CHF | 15/10/96 | 15/10/97 | 2248009 | 0 | |
| COM010082 | 0 | USD | 06/06/97 | 06/06/00 | 1444019 | 0 | |
| FRA-USD-CITI | 0 | USD | 18/12/96 | 18/12/99 | 196933 | 0 | |
| L000013233 | 25000000 | GBP | 04/11/94 | 04/11/97 | 0 | 0 | |
| L000044507 | 50000000000 | JPY | 13/06/96 | 17/12/99 | -77367 | 0 | |
| L000187481 | 50000000000 | ITL | 31/05/96 | 04/06/99 | -6035 | 0 | |
| LNCF186496 | 200000000 | DEM | 01/03/95 | 03/03/98 | 0 | 0 | |
| LNSW0035313 | 150000000 | SEK | 07/09/94 | 09/09/97 | -1994031 | 0 | |
| LNSW016798 | 50000000 | DEM | 27/05/92 | 15/07/97 | -1982180 | 0 | |
| LNSW016863 | 50000000 | DEM | 27/05/92 | 15/07/02 | -3351200 | 0 | |
| LNSW023285 | 100000000 | DKK | 23/06/93 | 23/06/98 | 1132865 | 0 | |
| LNSW026045 | 25000000000 | ITL | 15/10/93 | 19/10/00 | -1345684 | 0 | |
| LNSW028079 | 750000000 | FRF | 12/01/94 | 13/01/99 | -4898807 | 0 | |
| LNSW028815 | 100000000 | FRF | 03/02/94 | 04/02/98 | 440713 | 0 | |
| LNSW028953 | 100000000 | DEM | 08/02/94 | 10/02/04 | -3779613 | 0 | |
| LNSW029037 | 50000000000 | ITL | 10/02/94 | 14/02/98 | 227029 | 0 | |
| LNSW032838 | 250000000 | SEK | 15/06/94 | 17/06/99 | 3091420 | 0 | |

FIG. 11C

FILE IMPORT SPECIFICATION

Bank  Bank No. 1    Specification BANK1E    c:/derives/imports/bank1e.txt

| Input Field | Type | Format | Required | Position | Length | Map Table | Output Field | Default |
|---|---|---|---|---|---|---|---|---|
| BIC | fixed | | Yes | 0 | 0 | | BIC | BANK1 |
| client_class | text | | No | 1 | 0 | | | |
| counterparty | text | | Yes | 2 | 0 | MapCP | cpBIC | |
| counterparty | text | | Yes | 2 | 0 | | inputCP | |
| account_id | text | | No | 3 | 0 | | | |
| account_id_nam | text | | No | 4 | 0 | | | |
| transaction_id | text | | Yes | 5 | 0 | | transaction_id | |
| InputProduct | text | | Yes | 6 | 0 | | InputProduct | |
| transaction_type | text | | Yes | 6 | 0 | MapProduct | Product | |
| product_code | number | | No | 7 | 0 | | | |
| buy_sell_ind | text | | No | 8 | 0 | | Buy_Sell | |
| ccy1 | text | | Yes | 9 | 0 | | PayCcy | |
| ccy2 | text | | Yes | 10 | 0 | | RecCcy | [Ccy1] |
| trade_date | date | dd/mm/yy | Yes | 11 | 0 | | trade_date | |
| settle_date | date | dd/mm/yy | Yes | 12 | 0 | | settle_date | |
| start_date | date | dd/mm/yy | Yes | 13 | 0 | | start_date | [trade_dat |
| maturity_date | date | dd/mm/yy | Yes | 14 | 0 | | maturity_date | |
| security_id | text | | No | 15 | 0 | | | |
| notional1 | number | | Yes | 16 | 0 | | PayNotional | |
| notional2 | number | | Yes | 17 | 0 | | RecNotional | [notional1] |
| notional | number | | No | 18 | 0 | | | |
| mark_to_market | number | | Yes | 19 | 0 | | MTM | |
| Strike Prices | number | | No | 20 | 0 | | Strike Price | |

FIG. 12A

FILE IMPORT SPECIFICATION

| Bank | Bank No. 1 | | Specification BANKIN | | c:/derives/imports/bank1n.txt | | | |
|---|---|---|---|---|---|---|---|---|
| Input Field | Type | Format | Re'qd. | Position | Length | Map Table | Output Field | Default |
| BIC | fixed | | Yes | 0 | 0 | | BIC | BANK1 |
| transaction id | text | | Yes | 18 | 16 | | transaction_id | |
| ParentTransactio | text | | No | 60 | 16 | | ParentID | |
| inputCP | text | | Yes | 181 | 10 | MapCP | cpBIC | |
| inputCP | text | | Yes | 181 | 10 | | inputCP | |
| InputProduct | text | | Yes | 191 | 16 | MapProduct | Product | |
| InputProduct | text | | Yes | 191 | 16 | | InputProduct | |
| Buy/Sell | text | | No | 202 | 1 | | Buy_Sell | |
| call_put | text | | No | 204 | 1 | | call_put | |
| Strike Price | number | | No | 207 | 20 | | Strike Price | |
| ccy1 | text | | Yes | 243 | 3 | | Payccy | |
| ccy2 | text | | Yes | 247 | 3 | | Recccy | [ccy1] |
| notional1 | number | | Yes | 256 | 20 | | PayNotional | |
| notional2 | number | | Yes | 276 | 20 | | RecNotional | |
| notionalUSD | number | | No | 296 | 19 | | NotionalBase | |
| MTM | number | | Yes | 315 | 20 | | MTM | |
| MTMdate | date | dd/mm/yy | Yes | 335 | 10 | | MTMdate | |
| trade date | date | mm/dd/yyyy | Yes | 345 | 11 | | trade_date | |
| start date | date | mm/dd/yyyy | No | 357 | 11 | | start_date | |
| maturity date | date | mm/dd/yyyy | Yes | 369 | 12 | | maturity_date | |
| settlement date | date | mm/dd/yyyy | Yes | 381 | 11 | | settle_date | |

FIG. 12B

FILE IMPORT SPECIFICATION

Bank  Bank No. 2    Specification BANK2    c:/derives/imports/bank2.tab

| Input Field | Type | Format | Req. | Position | Length | Map Table | Output Field | Default |
|---|---|---|---|---|---|---|---|---|
| cpBIC | fixed | | No | 0 | 0 | | cpBIC | BANK1 |
| Product | fixed | | No | 0 | 0 | | Product | OTHER |
| BIC | fixed | | No | 0 | 0 | | BIC | BANK2 |
| transaction_id | text | | Yes | 1 | 0 | | transaction_id | |
| notional1 | number | | Yes | 2 | 0 | | Paynotional | |
| ccy1 | text | | Yes | 3 | 0 | | Payccy | |
| transaction_date | date | dd/mm/yy | Yes | 4 | 0 | | trade_date | |
| maturity_date | date | dd/mm/yy | Yes | 5 | 0 | | maturity_date | |
| deal_req | number | | Yes | 6 | 0 | | MTM | |

FIG. 12C

FILE IMPORT SPECIFICATION

| Bank | Bank No. 3 | | Specification BANK3 | | | c:/derives/imports/bank3.txt | | | |
|---|---|---|---|---|---|---|---|---|---|
| Input Field | Type | Format | Req'd | Position | Length | Map Table | Output Field | Default |
| buysell | fixed | | Yes | 0 | 0 | | buy_sell | |
| cpBIC | fixed | | Yes | 0 | 0 | | cpBIC | BANK1 |
| BIC | fixed | | Yes | 0 | 0 | | BIC | BANK3 |
| src_system_id | text | | No | 1 | 0 | | | |
| book_id | text | | No | 2 | 0 | | | |
| trade_id | text | | Yes | 3 | 0 | | transaction_id | |
| ticket_id | text | | No | 4 | 0 | | | |
| ins_type | text | | Yes | 5 | 0 | MapProduct | Product | |
| ins_type | text | | Yes | 5 | 0 | | inputProduct | |
| rec_notional | number | | Yes | 7 | 0 | | PayNotional | |
| rec_notional_ccy | text | | Yes | 13 | 0 | | PayCcy | |
| trade_date | date | dd/mm/yy | Yes | 14 | 0 | | trade_date | |
| maturity_date | date | dd/mm/yy | Yes | 15 | 0 | | maturity_date | |
| business_date | date | dd/mm/yy | Yes | 16 | 0 | | MTMdate | |
| base_mtm | number | | No | 17 | 0 | | MTM | |
| other_ccy | text | | Yes | 30 | 0 | | Recccy | [rec_notio |
| other_notional | number | | Yes | 31 | 0 | | RecNotional | [rec_notio |
| put_call | text | | No | 34 | 0 | MapCodes | call_put | |
| buy_sell | text | | No | 35 | 0 | MapCodes | buy_sell | |
| effective_date | date | dd/mm/yy | No | 37 | 0 | | start_date | |

FIG. 12D

Matching Criteria

Level external

| Order | Field1 | Field2 | Type | Tolerance | Ttype | Special | Value1 | Value2 |
|---|---|---|---|---|---|---|---|---|
| 1 | BIC | cpBIC | text | 0 | | | | |
| 2 | cpBIC | | text | 0 | | | | |
| 3 | ExternalMatchID | BIC | text | 0 | | | | |

Level full

| Order | Field1 | Field2 | Type | Tolerance | Ttype | Special | Value1 | Value2 |
|---|---|---|---|---|---|---|---|---|
| 1 | BIC | cpBIC | text | | | | | |
| 2 | cpBIC | BIC | text | | | | | |
| 3 | Product | | text | | | | | |
| 4 | PayCcy | | text | | | | | |
| 5 | RecCcy | | text | | | | | |
| 6 | PayNotional | | number | | | | | |
| 7 | RecNotional | | number | | | | | |
| 8 | maturity_date | | date | 5 | d | | | |
| 9 | trade_date | | date | 1 | d | | | |
| 10 | buy_sell | | text | 0 | | A | B | S |
| 11 | call_put | | text | 0 | | B | | |

Level level1

| Order | Field1 | Field2 | Type | Tolerance | Ttype | Special | Value1 | Value2 |
|---|---|---|---|---|---|---|---|---|
| 1 | BIC | cpBIC | text | | | | | |
| 2 | cpBIC | BIC | text | | | | | |
| 3 | Product | | text | | | | | |
| 4 | PayCcy | | text | | | | | |
| 5 | RecCcy | | text | | | | | |
| 6 | PayNotional | | number | | | | | |
| 7 | RecNotional | | number | | | | | |
| 8 | maturity_date | | date | 5 | d | | | |

Level level2

| Order | Field1 | Field2 | Type | Tolerance | Ttype | Special | Value1 | Value2 |
|---|---|---|---|---|---|---|---|---|
| 1 | BIC | cpBIC | text | | | | | |
| 2 | cpBIC | BIC | text | | | | | |
| 3 | Product | | text | | | | | |
| 4 | PayCcy | | text | | | | | |
| 5 | RecCcy | | text | | | | | |
| 6 | PayNotional | | number | | | | | |
| 7 | RecNotional | | number | | | | | |

FIG. 13

Tables of Data Fields

Trades Tables

| Name | Type | Length |
|---|---|---|
| ImportCode | Text | 10 |
| BIC | Text | 12 |
| cpBIC | Text | 12 |
| InputCP | Text | 50 |
| parentID | Text | 15 |
| transaction_id | Text | 20 |
| cp_transaction_id | Text | 20 |
| Product | Text | 8 |
| InputProduct | Text | 25 |
| PayCcy | Text | 5 |
| PayNotional | Number | 8 |
| RecCcy | Text | 5 |
| RecNotional | Number | 8 |
| NotionalBase | Number | 8 |
| trade_date | Date/Time | 8 |
| Start_Date | Date/Time | 8 |
| Maturity_Date | Date/Time | 8 |
| settle_date | Date/Time | 8 |
| Call_Put | Text | 5 |
| Buy_Sell | Text | 5 |
| Strike_Price | Number | 8 |
| MatchCode | Text | 15 |
| Matchnumber | Number (Long) | 4 |
| ManualMatch | Yes/No | 2 |
| ExternalMatchId | Text | 25 |
| ManualLink | Number (Long) | 4 |
| MTM | Number | 8 |
| MTMdate | Date/Time | 8 |
| reconflag | Yes/No | 1 |
| %diff | Number | 8 |
| absdiff | Number | 8 |
| status | Number | 2 |
| created | Date/Time | 8 |
| last_updated | Date/Time | 8 |

FIG. 14A

Tables of Data Fields

Import Specifications

| Name | Type | Length |
|---|---|---|
| ImportFileSpecs | | |
| ImportCode | Text | 10 |
| BIC | Text | 10 |
| Description | Text | 50 |
| filepath | Text | 50 |
| type | Text | 10 |
| delimiter | Text | 2 |
| skiprecs | Number (Integer) | 2 |
| eof | Text | 50 |
| outputtype | Text | 5 |
| table | Text | 50 |
| Active | Yes/No | 1 |

| Name | Type | Length |
|---|---|---|
| ImportFieldSpecs | | |
| ImportCode | Text | 10 |
| ifield | Text | 50 |
| itype | Text | 10 |
| iformat | Text | 25 |
| irequired | Yes/No | 1 |
| ikey | Yes/No | 1 |
| ikeyno | Number (Integer) | 2 |
| ikeyid | Text | 10 |
| ifieldpos | Number (Integer) | 2 |
| ifielder | Number (Integer) | 2 |
| imaptable | Text | 75 |
| ofield | Text | 50 |
| oformat | Text | 50 |
| defaultvalue | Text | 50 |
| comments | Text | 255 |

Map Tables

| Name | Type | Length |
|---|---|---|
| MapCF | | |
| Importcode | Text | 10 |
| inputvalue | Text | 50 |
| outputvalue | Text | 10 |
| MapProduct | | |
| importcode | Text | 10 |
| inputvalue | Text | 50 |
| outputvalue | Text | 10 |

FIG. 14B-1

Match Criteria

| Name | Type | Length |
|---|---|---|
| MatchCodes | | |
| MatchCode | Text | 25 |
| MatchOrder | Number (Integer) | 2 |
| Field1 | Text | 50 |
| Field2 | Text | 50 |
| FieldType | Text | 10 |
| Tolerance | Number | 8 |
| TolType | Text | 10 |
| Special | Text | 10 |
| Value1 | Text | 50 |
| Value2 | Text | 50 |

FIG. 14B-2

METHODS AND SYSTEMS FOR COLLATERAL MATCHING AND MARK TO MARKET RECONCILEMENT

PRIORITY APPLICATION

This application claims the benefit of U.S. Provisional Application No. 60/146,569 filed Jul. 30, 1999, entitled "System and Method for Mark to Market Reconcilement," and is incorporated herein by reference.

BACKGROUND OF THE INVENTION

1. Field of the Invention

The present invention relates generally to the field of collateral matching and mark to market reconcilement that allows parties to a financial transaction to easily, efficiently, and reliably manage the margining process. More particularly, the present invention provides secure, high-volume processing methods and systems for multiple financial instruments that combine collateral matching to identify matched and unmatched financial transactions and consolidated mark to market valuations for all parties to a matched financial transaction.

2. Background

Financial market participants are constantly aware of the risks and opportunities in the dynamics of the foreign exchange, derivatives market, and securities market. Bilateral margin agreements are dynamic market contracts in which the parties must account for the margin, the variance in value between the contract price and the market price. Subject to market fluctuations, the valuation of the margin by each party is often a source of conflict and tremendous market inefficiency. Whether it is the complexity and volume of the transactions between the parties, the use of different formulae to calculate the value of the transactions, or a combination of the above factors, the disconnect in margin valuation demands a time consuming manual review process that is detail-oriented and error prone. Manually reviewing a difference or discrepancy in the margin valuation keeps the parties from adequately and promptly assessing its business risks and opportunities in a rapidly changing market economy.

Bilateral margin agreements require each party to bear a high level of risk in dealing with the other. The variance of the market and its effect on the margin valuation can create various incentives for a party to take advantage of a favorable market or to remain inactive. The risk is in the party's mark to market valuation of the margin and in the varying market valuation of collateral agreements. Derivative instruments, such as, an interest rate swap, a currency swap, or an interest rate option, pose the greatest risk valuations because they are based on changes in terms of notional amounts and not on exact values.

Typically, a major party, A, such as any major global financial institution or bank, has a significant book (portfolio) of transactions. For example, a particular global bank may have anywhere from one to fifty (50) transactions against a counter-party, B. Those transactions might be booked and they might all be confirmed, but they are for different notional values, different periods of time, and, in fact, some of them may be interest rate swaps and some of them may be currency swaps. Such a portfolio of transactions raises a significant number of risk issues.

One of the risk issues, for example, is the mark to market value of a particular transaction. For example, the interest rate swap transaction that lasts over an eighteen (18) month period has an initial value at financial transaction date. However, because time passes and there is a timed value of money, the value of that transaction changes every day. It changes based on how interest rates change, which is the floating side; it changes based on exactly how time passes; and it also changes based on factors involved with the volatility of interest rates.

The changes can be calculated using, for example, complicated mathematical formulae, but the important factor is that the value of the transaction between A and B is different every day. In a portfolio of transactions, let us say fifty (50) transactions, for different values between A and B, some of these transactions can be in the money and some of them can be out of the money to either party. Generally, these values are netted because the parties have netting agreements established between them. However, the problem remains that it is most likely that one party is going to be net out of the money with the other party.

Assume, for example, that we have fifty (50) transactions in this portfolio between A and B, and that B is $2 million out of the money as of a given day, such as today. This means that A has at least $2 million of pure, economic risk that if B, for example, becomes bankrupt today, A will not receive these moneys. Therefore, the institution of collateral agreements has become commonplace within the marketplace.

A collateral agreement means that, based on certain parameters, if B is out of the money, such as $2 million, B will post an agreed upon amount of collateral to be held by A until the market changes. The market changes every day, and rather than going through the laborious and inefficient process of margin-call, B sends A collateral, a smaller sum of money, such as, $50,000.00. In other words, until the market changes $50,000.00 back in B's favor, A would keep the collateral. Collateral agreements make sense in continuing business relationships because the changing market conditions make it unreasonable to constantly move money between parties when one party's gains on one day may be losses on the next.

Given the improved efficiencies of collateral agreements over margin-calls, there are still inefficiencies in their use. For example, the amount of collateral must be agreed upon and must be delivered to the proper party. Additionally, the timely movement of collateral between parties can be a source of inefficiency if the parties are unable to agree upon the amount constituting collateral. Further, the difference in how parties mark to market the collateral becomes a critical issue.

Collateral, such as, a government bond is marked to market daily because like any other financial instrument, the value of that bond changes every day. Mark to market is a representation of the daily market value and the changes to those market values over a period of time. When any A has multiple collateral agreements with multiple parties, the portfolio of transactions typically includes a variety of different types of transactions, such as, foreign exchange forwards, interest rate swaps, and currency swaps. Accordingly, there is a myriad of bilateral margin agreements in place.

The current process of reconciling these types of financial transactions is manually intensive, extremely time consuming, and tedious. For example, when A and B have 500 transactions, it can take up to six months just to reconcile those transactions, because transactions are maturing and new transactions are entered into. Some of the transactions may be rather complex and may be under limited control in manual spreadsheets. When these transactions are handled on a manual basis, the mark to market updates can be made on an irregular and unsynchronized schedule, thus causing a disparity in the margin valuation and inefficiency incurred through the review process. At a high level of volume, the process becomes untenable, inefficient, and error prone.

The ability to reconcile a specific transaction that A is valuing and that B is also valuing is further affected by the likelihood that the two parties are not using exactly the same formulae for creating the value of that transaction. Without an established or agreed upon standard of formulae for calculating the margin, there will always be differences of opinion between A and B, although hopefully minor, as to what the value of a particular transaction is on any given day. Therefore, in addition to agreeing between parties A and B that these transactions exist and that the components of the transactions are equal, it is also necessary to mark to market the value of a particular transaction from both sides on a given day's basis and to reach an agreement on the net value of all transactions.

Thus, a need exists for a methods and systems for remotely accessing a secure communications network that provides parties a single point of entry to electronically process collateral matching and mark to market valuations of multiple financial instruments in numerous financial transaction. A need also exists for collateral matching and mark to market methods and systems that afford basic checks on financial transaction data and that prevents duplicate submission of this data. There is a further need for flexible collateral matching and mark to market methods and systems that are able to: (1) provide real-time identification of matched and unmatched financial transactions; (2) provide real-time mark to market portfolio valuations; (3) provide standard formulae and user preferences to develop algorithms for real-time mark to market portfolio valuations; (4) minimize manual review of discrepancies in margin valuations; (5) accommodate additional financial instruments and additional users as the system expands; (6) facilitate lower financial transaction and processing costs; (7) provide multilingual capabilities, settlement currencies, and other identifiers necessary to globally communicate with users interested in collateral matching and mark to market portfolio valuations; and (8) minimize the manual entry and re-keying of information into multiple formats and templates used by parties to a financial transaction.

SUMMARY OF THE INVENTION

To overcome the aforementioned problems, the present invention provides an easy, efficient, and reliable standard for parties to efficiently, accurately, and immediately evaluate its relative market positions by providing methods and systems for collateral matching and mark to market valuations of multiple financial transactions. The system utilizes computer hardware and software and makes use of a number of key components, such as a data translation engine, a matching and reconciliation engine with bilateral capabilities, and a client-side reporting administration system using web-based technology. In a secure interface via encrypted and authenticated file transfers, the methods and systems for an embodiment of the present invention enable any execution confirmation matching system to feed the results of a matched transaction to the mark to market reconcilement system to collaterally match and to derive mark to market valuations.

In an embodiment of the present invention, financial transaction data is transmitted using web-based technology or using a computer-to-computer interface (e.g., a direct link to a broker's order capture system). The financial transaction data transmitted by a party is formatted to FIX, SWIFT, or another standard electronic format. Once in a standard format, the transaction data is transmitted and stored to a communications network that any party can access to track the status of the collateral matching and mark to market valuations and to report on exception items.

In an embodiment of the present invention, the methods and systems consist of one or more client terminals that works in conjunction with a communications network(s), network server(s), and database(s). The client terminal is an interactive electronic communications device, such as, for example, PC's and/or servers running UNIX or LINUX, a Macintosh, a personal digital assistant (PDA), a pen-based computer, an interactive pager, mobile and cellular phones, a WAP phone, an interactive television, and the like. The client terminal gets all the data it needs to display "user modules" that represent screens displayed on a client terminal and allows a user to view, input, select, and/or transmit financial transaction data, including user instructional data. For example, instead of a party manually reviewing portfolio accounts to determine matched financial transaction and mark to market valuations, financial transaction data is transmitted in an electronic transfer medium, such as, an interactive web-page. The financial data standardized, verified, stored, identified as matched, unmatched, or marked as an exception. Thereafter, mark to market valuations of the transaction data are automatically performed using algorithms of standard formulae and user instructions.

In an embodiment of the methods and systems of the present invention, web-browser/web-server technology can be used in a GUI application to generate, access, and download client reports, and act as an administrative interface. The web-browser is used to deliver a client report to provide the following information: total mark to market valuation, matched financial transactions, unmatched financial transactions, import errors, and other information as required. In an embodiment of the present invention, the web-browser further enables users to generate and transmit administrative instructions for file transfer. The user is able to link and unlink financial transactions, manually match and unmatch financial transactions, add or amend product codes and parties, upload financial transaction data files, download results data, and manage other administrative portfolio tasks.

In an embodiment of the methods and systems of the present invention, a server side data translation engine can translate a party's financial transaction data into a standardized format through data parsing, validation, and format conversion. All file imports are logged and time-stamped in order to provide a complete history and audit trail. Any errors encountered in the import process are logged and written into a database unless primary key data is missing. In another embodiment, this engine offers the flexibility of creating new import specifications and modifying existing ones in order to accommodate new file formats and changes in data content.

In an embodiment of the present invention, the data translation engine feeds the standardized data to a separate server side engine with bilateral capabilities to match and reconcile financial transactions. This matching and reconciliation engine updates existing financial transactions and inserts any new financial transactions. Specifically, existing unmatched financial transactions are updated with the latest data and existing matched financial transactions are updated to the latest mark to market value. Any other variable fields deemed necessary are also be updated. The system then attempts to match any new financial transactions that have arrived. On a periodic basis set by the user, the system will carry out the reconciliation process for all matched financial transactions that have been updated in the previous period.

In another embodiment of the invention, software encryption and authentication is accomplished using something akin to the concept of having public and private keys. The security system generates a pair of linked keys—one of which is public and the other is private. The public key is used to generate an encrypted file and can only be decrypted by using the private key. The public key is thus distributed by a party to another party (e.g., counter-party) that it wishes to exchange encrypted data.

In addition to providing the methods and systems outlined above, the present invention: (1) provides highly configurable data import/export specifications; (2) standardizes data formats data; (3) facilitates automatic file transfer; (4) provides near real-time mark to market comparisons of selected financial transaction valuations; (5) allows a user to define decision making criteria to reconcile the mark to market value of matched transactions; and/or (6) notifies each party of new financial transactions.

In another embodiment of the present invention, the methods and systems may be utilized to perform one or more of the following tasks: (1) utilize a user-friendly interactive user interface; (2) provide integration with external and internal systems; (3) provide detailed reports; (4) allow for real-time system modifications and system configuration; (5) allow for customized import/export files; and/or (6) utilize state-of-the-art communications technology.

Further details on these embodiments, other possible embodiments, and additional methods and systems of the present invention are set forth below.

As are appreciated by those of ordinary skill in the art, the methods and systems of the present invention have wide utility in a number of areas as illustrated by the wide variety of features and advantages discussed below.

It is a feature and advantage of the present invention to provide methods and systems of automatically collecting and distributing collateral mark to market valuation reconcilement information associated with a financial transaction that provide real-time notification of all valuation changes to parties to a financial transaction.

It is another feature and advantage of the present invention to provide methods and systems for automated collateral matching and mark to market reconcilement with a global reach that reduces manual activity, expands productivity, and acts as a bridge to both confirmation and depository systems.

It is another feature and advantage of the present invention to import and store financial transaction data feeds by remote booking/accounting systems and to allow all parties to a transaction to be aware of a new transaction whenever the transaction is uploaded.

It is another feature and advantage of the present invention to access, convert, manage, store, and transmit electronic financial transactional data associated with collateral matching and mark to market valuations.

It is another feature and advantage of the present invention to enable parties in a transaction to establish norms and other reconcilement criteria, and, to thereby, monitor mark to market values with more certainty.

It is another feature and advantage of the present invention to allow the use of different reconcilement algorithms or sets of algorithms among parties to a financial transaction.

It is another feature and advantage of the present invention to evaluate data fields in a financial transaction and to match financial transactions based on data tolerances and/or user preferences.

It is another feature and advantage of the present invention to evaluate date fields in a financial transaction and to match financial transactions based on date tolerances and/or user preferences.

It is another feature and advantage of the present invention to evaluate number fields in financial transaction data and match transactions based on number tolerances and/or user preferences.

It is another feature and advantage of the present invention to reduce costly exception processing associated with collateral matching and mark to market valuations.

It is another feature and advantage of the present invention to generate key financial reports that a party can use to monitor and control portfolios of collateralized agreements and other bilateral margin agreements.

It is another feature and advantage of the present invention to eliminate the need for customers using a depository or collateral agent to re-key daily data.

It is another feature and advantage of the present invention to make file hand-offs automatic.

It is another feature and advantage of the present invention to convert data into a standardized format.

It is another feature and advantage of the present invention to provide flexible data conversion parameters.

It is another feature and advantage of the present invention to authenticate, verify, and confirm mark to market parameters and financial transaction data to reconcile matched financial transactions.

It is another feature and advantage of the present invention to automatically export financial transactional data to multiple users, including buyers, sellers, and third parties (e.g., collateral agents, depositories, etc.).

It is another feature and advantage of the present invention to provide detailed audit reports to capture the actions, events, errors, and the like involved in the import and/or export of data, in the internal processing of data, and in the manual matching and reconcilement processes.

It is another feature and advantage of the present invention to provide security, authentication, and entitlement features.

It is another feature and advantage of the present invention to allow a party to enter and submit financial transaction data and to modify previously submitted financial transaction data.

It is another feature and advantage of the present invention to provide a flexible collateral matching and mark to market system that is capable of accommodating changes in the system architecture.

It is another feature and advantage of the present invention to accommodate growth in the number of users (e.g., parties, system administrators, etc.).

It is another feature and advantage of the present invention to provide a collateral matching and mark to market system that is capable of running on many different hardware platforms and with many different operating systems.

It is another feature and advantage of the present invention to interface and communicate with the network communications system through a variety of electronic mediums, including wireline and wireless technology, such as, for example, WAN, LAN, PSTN, public networks, satellite systems, and the like.

It is another feature and advantage of the present invention to provide on-line system help to the user.

It is another feature and advantage of the present invention to provide for multiple levels of user access and to facilitate multiple levels of security related to those levels of user access.

It is another feature and advantage of the present invention to secure the source code on the network server and/or communications network.

It is another feature and advantage of the present invention to provide a user with access to a variety of optional additional useful administrative features, such as, for example, changing a password, adding a financial instrument, and setting defaults.

It is another feature and advantage of the present invention to have one standardized user interface regardless of a user's computer system (i.e., the hardware platforms, operating systems, programming languages, software applications, and other computer technology).

It is another feature and advantage of the present invention to allow a user to store data on a local computer or local network.

It is another feature and advantage of the present invention to provide multilingual capabilities including translations of financial transaction data, including mark to market data and user data.

It is another feature and advantage of the present invention to allow a user to select a language (e.g., English, French, Spanish, German, etc.) to display user module information, including data that is uploaded or downloaded by a user.

It is another feature and advantage of the present invention to allow for single data entry in order to eliminate the mistakes caused by the re-entry of data by multiple users, and accordingly, to reduce the need for personnel to enter financial transaction data and reconcilement data.

It is another feature and advantage of the present invention to significantly reduce the time required by the overall reconcilement process.

These advantages and features may be accomplished singularly, or in combination, in one or more of the embodiments of the present invention.

Additional uses, objects, advantages, and novel features of the invention are set forth in the detailed description that follows and will become more apparent to those skilled in the art upon examination of the following or upon learning by practice of the invention.

BRIEF DESCRIPTION OF THE FIGURES

Other advantages and features of the invention are more clearly understood by reference to the following description taken in connection with the accompanying figures, in which:

FIG. 5, entitled "Exposure Summary Report for Bank No. 1," illustrates a sample Exposure Summary Report in an embodiment of the methods and systems for collateral matching and mark to market reconciliation.

FIGS. 6A-1 to 6D-2, entitled "Data Table for Matched Financial Transactions," illustrate sample data for matched financial transactions in an embodiment of the methods and systems for collateral matching and mark to market reconciliation.

FIGS. 7A and 7B, entitled "Data Table for Unmatched Financial Transactions," illustrates sample data for unmatched financial transactions in an embodiment of the methods and systems for collateral matching and mark to market reconciliation.

FIGS. 8A and 8B, entitled "Data Table for Expired Financial Transactions," illustrates sample data for expired financial transactions in an embodiment of the methods and systems for collateral matching and mark to market reconciliation.

FIG. 9, entitled "Import Errors Bank No. 2," illustrates a sample Import Error Report in an embodiment of the methods and systems for collateral matching and mark to market reconciliation.

FIG. 10, entitled "International Swap Dealer Association (ISDA) Agreement Matrix," illustrates a sample ISDA agreement matrix in an embodiment of the methods and systems for collateral matching and mark to market reconciliation.

FIGS. 11A to 11C, entitled "Sample Input Data Files—Three (3) Types of Input Formats," illustrates sample input data files in an embodiment of the methods and systems for collateral matching and mark to market reconciliation.

FIGS. 12A-D, entitled "File Import Specification," illustrates samples of file import specifications in an embodiment of the methods and systems for collateral matching and mark to market reconciliation.

FIG. 13, entitled "Matching Criteria," illustrates data tables of matching criteria data fields in an embodiment of the methods and systems for collateral matching and mark to market reconciliation.

FIGS. 14A and to 14B-2, entitled "Tables of Data Fields," illustrate sample tables of data fields in an embodiment of the methods and systems for collateral matching and mark to market reconciliation.

DETAILED DESCRIPTION

The essence of the present invention is to automate the collateral matching and derivative mark to market (MTM) reconcilement process by accepting one or more files of financial transaction data from numerous parties and to produce market valuations and reports that enable each party in a multi-party financial transaction to agree and adjust its relative collateral positions simply and quickly. The present invention is related to, but remains independent of, any execution confirmation matching system.

The system reconciles the MTM value of multiple financial instruments. Any financial instrument (e.g., interest rate swaps, currency swaps, interest rate options, non-delivery versions of foreign exchange related products, etc.) may be matched and reconciled. In an embodiment, the present invention reconciles matched financial transactions that are handed-off by a party such that the financial transaction data can be accepted without the need for re-matching.

The present invention will now be described in more detail by illustrative examples with reference to the embodiment(s) depicted in the Figures. The following described embodiment(s) is presented by way of example and should not be construed as limiting the inventive concept to any particular configuration.

Figure 1A:
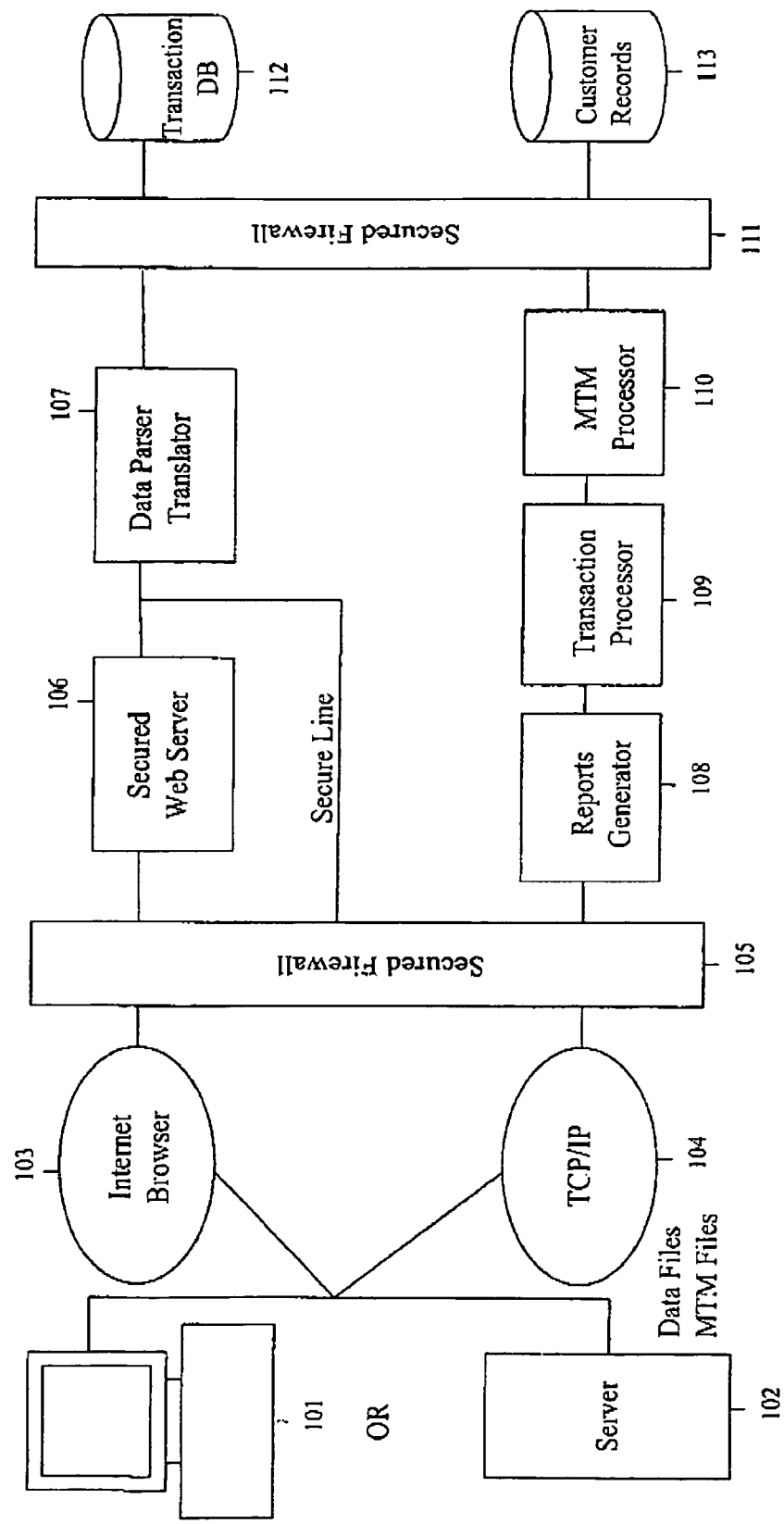
FIGS. 1A, entitled "MTM Reconcilement Topology Overview," and 1B, entitled "MTM Reconcilement System Schematic," illustrate overviews of the reconcilement topology and system schematic in one or more embodiments of the methods and systems for collateral matching and mark to market reconciliation.
Figure 1B:
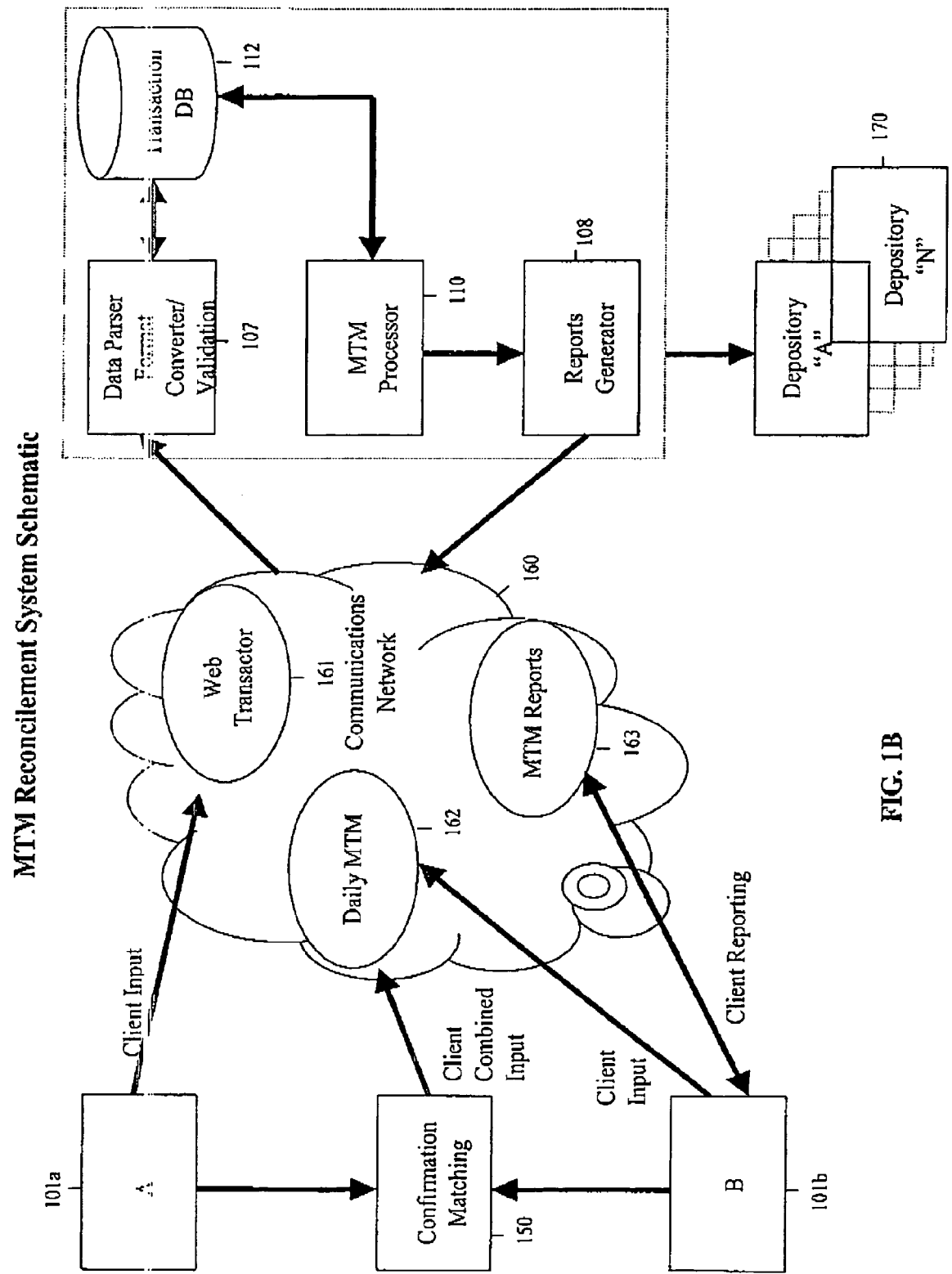

Referring to FIGS. 1A and 1B, a basic overview of the mark to market (MTM) topology and system schematic is depicted. As shown in FIG. 1, a client terminal 101a, 101b or a server 102 is connected over a secured firewall 105 to a communications network 160. The communications network 160 includes a secured web-server 106, a data parser/translator 107, a reports generator 108, a transaction processor 109, and a MTM processor 110. Daily MTM values 162, MTM reports 163, and a web-transactor 161 are maintained and communicated via the communications network. Further, the communications network 160 is coupled over a secured firewall 111 to a transaction database 112 and a database containing customer records 113 (e.g., records containing profile data of each party, financial service provider, etc.). Depositories or other third parties 170 may also be connected and have access to information in the communications network 160. Transmission Control Protocol/Internet Protocol (TCP/IP) 104 may be utilized over a virtual private network wherein a user can dial in through a modem, over integrated services digital network (ISDN), or over a fixed line, such as, for example, a leased line to access the communications network 160. Alternatively, the system operates over the Internet using a web-browser 103 with suitable bridges and security.

The collateral matching and mark to market system includes at least one client terminal 101a, 101b. The client terminal 101a, 101b typically includes a central processing unit (CPU), a monitor or other visual display device, a keyboard or some other input device, and a communications device. Client terminals 101a, 101b transmit and receive data to and from a server 106 via a communications network 160. Client terminals 101a, 101b interact with the server 106 in a typical client/server platform. The operation of the system according to the embodiment shown in FIG. 1 is as follows. A party at a client terminal 101a accesses the communications network and transmits financial transaction data, including financial data and user profile data. The server 106 either creates a new object in the software or modifies an existing object to standardize and store the financial transaction data. Thereafter, the financial transaction data is automatically matched and reconciled using parameters specified by a party. A counter-party sitting at another client terminal 101b can then enter the system and access the uploaded financial transaction data and results including matched transactions and mark to market valuations for specific financial instruments.

In a possible embodiment of the present invention, the client terminal 101a, 101b may be any PC running a Windows operating system or may be a Windows NT workstation with access to a global communications network 160, such as, the Internet. For example, the client terminal 101a, 101b may be a PC that supports either Internet Explorer or Navigator to provide access to the Intranet or Internet. Alternatively, it should be appreciated that the client terminal 101a, 101b could take on a variety of other suitable forms, such as, for example, PC's and/or servers running UNIX or LINUX, a Macintosh, a PDA, a pen-based computer, an interactive pager, mobile and cellular phones, a WAP phone, an interactive television, and the like. Furthermore, the client terminal could be electronically connected to a communications network 160 by way of other wireline or wireless technology, including, for example, WAN, LAN, PSTN, public networks, satellite systems, and the like.

In an embodiment of the present invention, the client terminal 101a, 101b displays user modules that represent screen shots and prompts the user to view, input, export, select, and/or transmit various information about financial transactions, user information, collateral matching criteria, other decision making criteria, and mark to market valuations. The user modules may be advantageously displayed as web-page projected upon a client terminal 101a, 101b running a web-browser 103 coupled with to a communications network 160.

Figure 2:
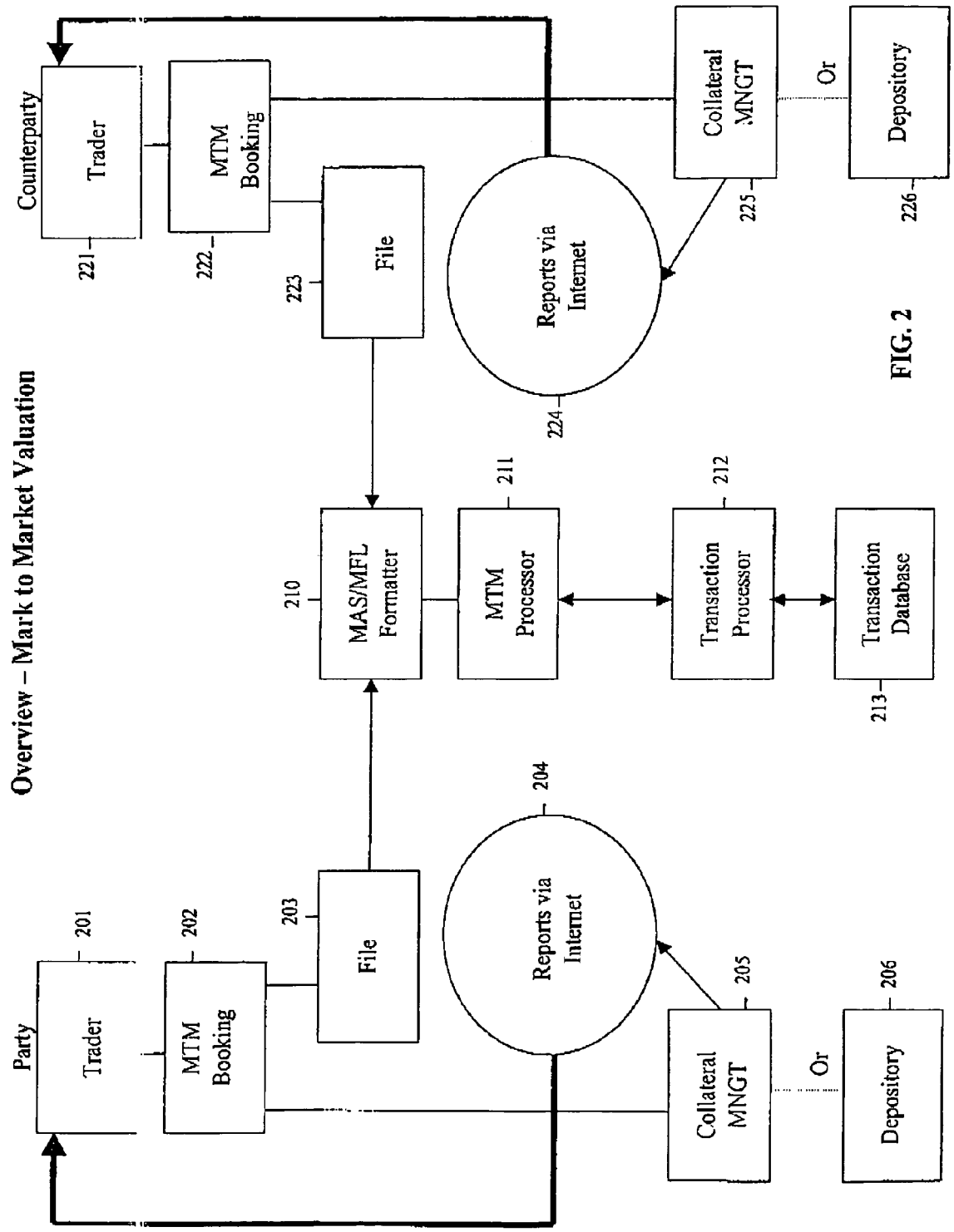
FIG. 2, entitled "Overview—Mark to Market Valuation," illustrates an overview of the mark to market valuation process flow in an embodiment of the methods and systems for collateral matching and mark to market reconciliation.

FIG. 2, entitled "Overview—Mark to Market Valuation," illustrates an embodiment of the mark-to-market process flow between the parties 201, 221 after the financial transactions are input and matched 211 within the system. After each specified period of time, usually once daily, all derivative transactions are marked to market 202, 222 by a party 201, 221. Each party's formulae may be different and proprietary. As a contributing member of the system, each party 201, 221 runs their proprietary MTM systems 202, 222 to value their transactions.

Then, the results of these MTM bookings 202, 222 are fed in a known file format 203, 223 to the formatting module 210. Both parties may prepare and send their MTM values in different formats. The data is then parsed and translated to a standardized format 210 and transmitted to the MTM processor 211.

Next, the transactions containing the newly updated MTM values are matched by the transaction processor 212 against the data contained in the transaction database 213. Thereafter, the current MTM values replace the last set of MTM values. This occurs for each party that submitted MTM values, including revised MTM values.

The MTM processor 211 generates the reports for each party's transactions versus those of the appropriate counter-party, such that if all parties submitted revised MTM values, a complete set of valuations for each party's portfolio of transactions would result.

Each party 201, 221 is able to access the reports via a communications network 204, 224 and can electronically export the data to be used either as input to their own collateral management systems 205, 225 or to the system of the depository 206, 226 managing their collateral portfolio. The data may also be printed out in a multitude of user specified reports.

Figure 3:
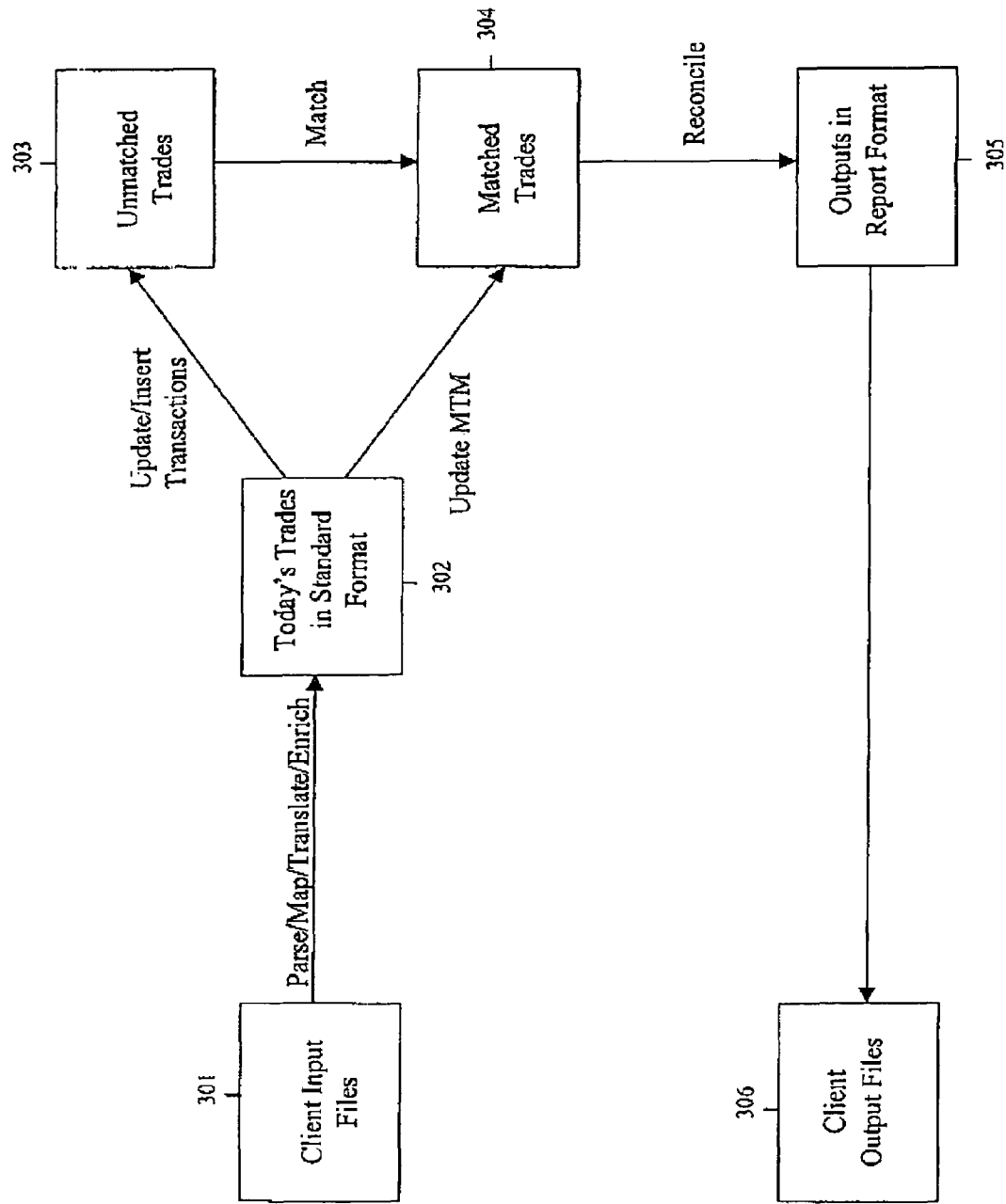
FIG. 3, entitled "Financial Transaction Data Flow," illustrates the financial transaction data flows in an embodiment of the methods and systems for collateral matching and mark to market.

FIG. 3, entitled "Financial Transaction Data Flow," illustrates the financial transaction data flows in an embodiment of the methods and systems for collateral matching and mark to market valuation. Note that the financial transaction depicted in FIG. 3 is a trade. A party inputs or uploads data files 301 to the system and the system parses, maps, translates, and enriches the data files into a standard format 302. The data files may be used to update and insert financial transaction data for unmatched financial transactions 303, and is then used to match a financial transaction 304. Alternatively, the data files may be used to update the mark to market value of a matched financial transaction 304. After a transaction is matched 304, the system reconciles the mark to market value and transmits the output into a report format 305 that can be output or downloaded to a party's PC or computer information system 306.

Figure 4:
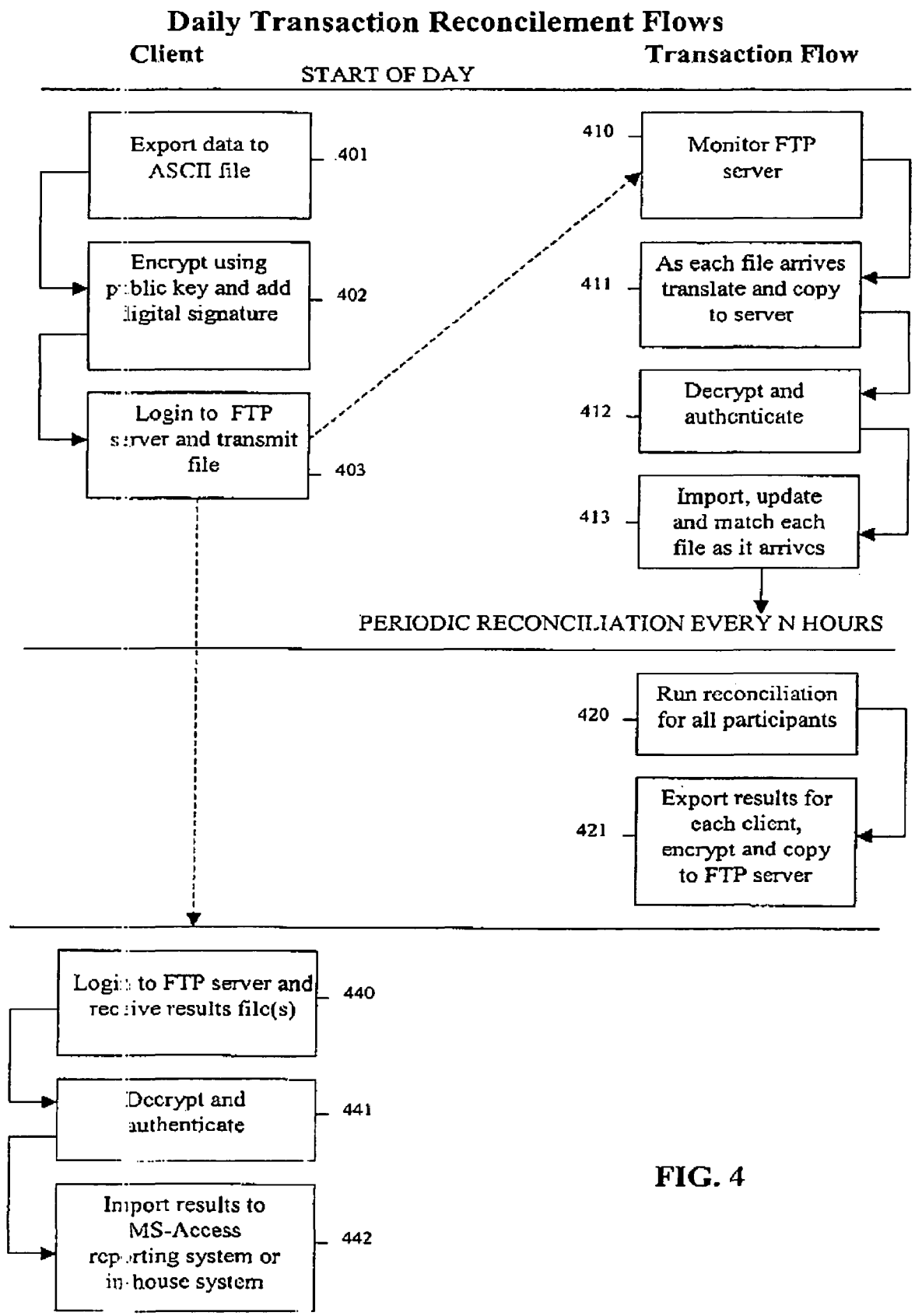
FIG. 4, entitled "Daily Transaction Reconcilement Flows," illustrates the daily process flows in an embodiment of the methods and systems for collateral matching and mark to market.

FIG. 4, entitled "Daily Transaction Reconcilement Flows," further illustrates the daily transaction reconcilement flows in an embodiment of the methods and systems for collateral matching and mark to market. A party exports data to a standard format 401 which is encrypted using public key and other security precautions 402. Thereafter, the data is transmitted to a server 403, and the "transaction" process begins. The data is monitored on the server 410 and translated and copied to a data file 411. The data file is decrypted and authenticated 412, and then imported, updated, and matched with other financial transaction data 413. The system runs a reconcilement process 420 for the matched transactions and exports the results to each party in an encrypted format 421. A party can access the server 440 and receive the results of the matching and the mark to market reconcilement process. The server or software running on the party's local computer system decrypts and authenticates the results 441 and imports the results to the party's local computer system 442.

As illustrated in FIGS. 3 and 4, a key aspect of present invention is to capture financial transactions that both parties, such as parties A and B, have agreed upon in terms of the financial transaction data. This also assures that both parties are simultaneously aware of new transactions. If the transactions are fed by remote booking systems, this can occur when the transaction is booked. The methods and systems for an embodiment of the present invention assist both parties in establishing reconciliation norms and then in monitoring the mark to market values with more certainty, reducing costly exception processing on all sides, which is the main engine for change in this particular marketplace.

Currently, the fact is that the exception processing requirements are extremely onerous on all parties. The methods and systems for an embodiment of the present invention requires little or no reprogramming of customer systems. The system for an embodiment of the present invention generates reports in an on-line mode that are available to users and that display key financial information that the collateral units of individual users can use to monitor and control their portfolios of collateralized agreements and the transactions covered by those agreements with a certainty that the parties are using the same formulae.

An embodiment of the present invention provides a global system that reduces manual activity while expanding productivity and acts as a bridge to any confirmation system or systems, as well as to some depository systems. Assume four parties, such as parties A, B, C, and D, which can all be, for example, financial institutions, such as, banking institutions. Most complex transactions, such as swap type transactions are, in fact, executed between two financial institutions. Party A can be one financial institution, and B can simply be a different financial institution. Parties B, C, and D can be, for example, the three largest counter-parties to A's interest rate swaps book. They are not restricted as to geography or the like.

If A has collateral agreements, for example, with parties B, C, and D, and B has agreements, for example, with parties A, C, and D, and so on, there is a whole series of bilateral, collateral agreements between these four parties. In an embodiment of the present invention, transactions are marked to market nightly, for example, within A's mainframe or A's server (or B's server or C's server or D's server). Once this is completed, they feed via a secure high volume line the transaction identifications and the mark to market values for those transactions to the system for an embodiment of the present invention.

In the aforementioned embodiments, a user inputs files (files that are provided by parties A, B, C, and D) of financial transaction details and of the mark to market values associated with those financial transactions. This can be a daily (or more frequent) data feed that includes an identification portion and a mark to market portion of the feed. The system for an embodiment of the present invention takes this feed, translates the data to a common format, and then parses it, and validates that, in fact, the system has reconciled the transaction. If the system has not reconciled the transaction, the system parses it, maps it into the language that the reconcilement system understands, and then performs a reconcilement, for example, against client B's input files.

Therefore, the system translates all of the financial transaction data, for example, of today's financial transactions in standard form and goes through a matching routine, as opposed to a confirmation routine, to see, for example, if B has input B's side of this particular transaction. Once that reconciliation process takes place, then, for example, for the next day's feed, the only information the system actually parses out is the new mark to market value.

In an embodiment of the present invention, the output files are, in fact, web-enabled. Effectively, they are portfolio reports that the system allows the customer to access and to see what their mark to market values are versus, for example, any B, or any C or D, and so on, and likewise, with any of the other parties. Thus, the parties can see what their netted value of portfolio transactions is versus other individual counter-parties. By enabling the parties to do this, they can determine very quickly whether or not more or less collateral is required, and whether, in fact, there is a change of collateral required under the terms of the collateral agreement. It is extremely important in a collateral agreement to have current and accurate mark to market values against the collateral agreement to reduce risks for each of the parties, and the methods and systems for an embodiment of the present invention provide a means to reduce such risks.

The complexities of the process are multiplied by the fact that many of these financial institutions have what are known as global books. A global book means that certain transactions are booked, for example, in the United States; other transactions of the same portfolio against B may be booked in the United Kingdom, and still other transactions may be booked in Singapore for, example, against Asia Pacific counter-parties. When dealing with a bilateral agreement, it means dealing with a netted totality of those transactions versus the same totality of any B. This requires, basically, a 24 hour by 7 day capability, so that a financial institution with a global book is always updating its mark to market values against a party, against the global book of transactions.

Currently, all counter-parties basically deal on a bilateral basis, many of them on a manual basis. The methods and systems for an embodiment of the present invention, provides a 24 hour by 7 day platform with a web-enabled capability of reviewing portfolios of mark to market values to any party anywhere in the world. An embodiment of the present invention includes, for example, a number of major aspects. One aspect, for example, is the matching and reconciliation aspect. Once a transaction has been matched and reconciled in a transaction between parties, such as A and B, another aspect of an embodiment of the present invention, for example, is that then the system is able to take and parse an updated mark to market valuation against those matched transactions and perform mathematical calculations to create a netted value against those transactions. Still another aspect for an embodiment of the present invention is to enable a customer to review and receive on-line reports of the customer's global portfolio. This is done at a server level, in which the client is enabled to access the server for an embodiment of the present invention from their local PC and review their positions.

Another function that a party has is the ability to export financial transaction data on the system by a counter-party into another spreadsheet. A party can download the data into his or her booking/accounting system and generate his or her own spreadsheet. The client application (e.g., GUI) for an embodiment of the present invention can be programmed to take on most any format of spreadsheet that a party utilizes. In this way, a party can import their latest financial transactional data every morning into the system and make it available to any counter-party that access the system.

Referring now to FIG. 5, entitled "Exposure Summary Report for Bank No. 1," a sample Exposure Summary Report is provided to illustrate a report in an embodiment of the methods and systems for collateral matching and mark to market reconciliation. The sample report represents the exposure of one party, represented by Bank 1, to two or more other parties, represent by Bank 2 and Bank 3.

The exposure that Bank 1 has to the others is separated between those transactions that are matched, for instance between Bank 1 and Bank 2, and those that are not matched between Bank 1 and Bank 2. Each bank's transaction values are accumulated for that portion of the portfolio that is matched and unmatched. The individual net sums mean that when all transactions are summed, keeping mind of the sign of the value according to that parties MTM value, the net exposure of Bank 1 to Bank 2 can be visually depicted. In this illustration, Bank 1 has a 21,214,590.41 total positive exposure to Bank 2; Bank 2 has a total negative exposure to Bank 1 of 41,281,764; and the total net exposure that Bank 2 has to Bank 1 is 20,067,173.59. This is repeated for each counter-party that Bank 1 has exposure to or from.

FIGS. 6A-1 to 6D-2, entitled "Data Table for Matched Financial Transactions," illustrate sample data for matched financial transactions in an embodiment of the methods and systems for collateral matching and mark to market reconciliation. The present invention matches all transactions input by each bank to the other.

FIGS. 6A-1 and 6A-2 represents the matched transactions between Bank 1 and Bank 2. The table displays all data for both banks that represent the matching criteria. Once a financial transaction is matched, the two sides of the matched transaction ire given a unique identifier known as the "Recon Matching ID" that remains for the life of the matched transaction. FIG. 6B is a continuation of FIG. 6A so that the totals are displayed. The totals include the number of records and the net sum of he mark to market values of matched trades.

FIGS. 6C-1 and 6C-2 shows similar matched trades between Bank 1 and Bank 3. FIGS. 6D-1 and 6D-2 is a continuation of 6C-1 and 6C-2 so that the totals are displayed, as in FIGS. 6B-1 and 6B-2. This particular example shows a net negative mark to market value from Bank 1 to Bank 3.

FIGS. 7A and 7B, entitled "Data Table for Unmatched Financial Transactions," depicts an unmatched financial transaction table representing two parties, Bank 1 and Bank 2. All transaction data is displayed so that Bank 1 can use this table as a worksheet when reconciling with Bank 2. All transactions are viewed from the point of view of Bank 1, although the system knows that the counter-party for each of the transactions represented is Bank 2.

FIGS. 8A and 8B, entitled "Data Table for Expired Financial Transactions," illustrates sample data for financial transactions that have expired or matured. The table displays all expired transaction where Bank 1 is one party and Bank 2 is the counter-party. The table is divided by those transactions denominated in United States Dollars (USD) and those denoted by other currencies.

FIG. 9, entitled "Import Errors Bank No. 2," illustrates financial transaction data submitted by one party, Bank 2, that failed validation checks and was subsequently rejected. Financial transaction data may be rejected because the data file doesn't contain certain required fields or because certain fields contain specific data formats. This table includes all rejections with the appropriate error messages.

FIG. 10, entitled "International Swaps Dealers Association (ISDA) Agreement Matrix," illustrates a sample ISDA Agreement Matrix in an embodiment of the methods and systems for collateral matching and mark to market reconciliation. The ISDA is an industry managed association that creates and maintains standards for how financial transactions are processed by all parties. These standards are different for each type of financial instrument, and likewise there are different standards of documentation for each type or class of financial transaction.

The ISDA Agreement Matrix shows that any party can have different agreements or versions of the agreements with different counter-parties, depending when the agreements were negotiated. The ISDA matrix serves as the baseline for the present invention to recognize the terms under which the financial transaction is processed.

FIGS. 11A to 11C, entitled "Sample Input Data Files," illustrates three sample input data file formats in an embodiment of the methods and systems for collateral matching and mark to market reconciliation. The three formats include:
Tab Delimited
Fixed Format
Tab Delimited with Headings.

FIGS. 12A-D, entitled "File Import Specification," represent examples of inputs that have been stripped from the formats provided by the inputting party and that are translated to the standard mark to market reconcilement format.

FIG. 13, entitled "Matching Criteria," illustrates a data table of matching criteria in an embodiment of the methods and systems for collateral matching and mark to market reconciliation. In this embodiment, the present invention uses field matching criteria to match financial transactions from two or more parties. Some fields require exact matches, while others may have tolerances. For example, data that shows a date for party A that is one day different from the corresponding date for party B may still be considered as a matching date.

There are also different levels of matching. For example, two parties may bilaterally determine a very lenient matching criteria that is categorized by the system as a "Level 3" matching criteria. In this instance (i.e., Level 3), many fields require exact matches, but the maturity date of the transaction could be different by ten days for a transaction between the two parties and still be considered a matched trade.

FIGS. 14A and to 14B-2, entitled "Tables of Data Fields," illustrate sample financial transaction data tables that specify the field names, the data type within the field, and the maximum data length of the field.

The foregoing description and associated figures detail only illustrative examples of the environment in which the invention can be used and are not intended to be limiting. For instance, data fields and attributes can be constantly updated and added by authorized users (e.g., parties, system administrators, financial service providers, etc.). Furthermore, the programming languages, software platforms, operating systems, hardware components, communications protocols, and other technology mentioned in the foregoing description are by way of example only, and the present invention may always be enhanced to incorporate the most advanced available technology. Variations and modifications of the present invention is apparent to one skilled in the art, and the above disclosure is intended to cover all such modifications and equivalents.

What is claimed is:

1. A platform-independent method of collateral matching and mark to market reconcilement using a global communications network, comprising:

receiving by a transaction processor via the global communications network a first set of financial transaction data for at least one transaction from a first user and a second set of financial transaction data for the at least one transaction from a second user, wherein said financial transaction data comprises financial data and user instructional data, comparing by the transaction processor the first set of financial transaction data with the second set of financial transaction data to determine a collateral match decision for the at least one transaction;

thereafter iteratively receiving from the first user by the transaction processor on succeeding periodic occasions a marked-to-market valuation for the first set of financial transaction data for the at least one transaction marked to market according to mark to market parameters for said first set of financial transaction data associated with said collateral match decision via the global communications network and iteratively receiving from the second user on each of said succeeding periodic occasions a marked-to-market valuation for the second set of financial transaction data for the at least one transaction marked to market according to mark to market parameters for said second set of financial transaction data associated with said collateral match decision via the global communications network;

reconciling by the transaction processor on each of said succeeding periodic occasions the received marked-to-market valuation for the first set of financial transaction data for the at least one transaction marked to market according to the mark to market parameters for said for said first set of financial transaction data associated with said collateral matched decision to the received marked-to-market valuation for the second set of financial transaction data for the at least one transaction marked to market according to the mark to market parameters for said second set of financial transaction data associated with said collateral matched decision;

providing by the transaction processor on each of said succeeding periodic occasions a netted value between the received mark-to-market valuation for the first set of financial transaction data for the at least one transaction marked to market according to the mark to market parameters for said first set of financial transaction data associated with said collateral matched decision and the received marked-to-market valuation for the second set of financial transaction data for the at least one transaction marked to market according to the mark to market parameters for said second set of financial transaction data associated with said collateral matched decision; and receiving by the transaction processor on at least one of said succeeding periodic occasions via the global communications network, simultaneously with receipt from the first user of the marked-to-market valuation for the first set of financial transaction data for the at least one transaction, a first set of financial transaction data for at least one new financial transaction from the first user and receiving by the transaction processor on said at least one of said succeeding periodic occasions via the global communications network, simultaneously with receipt from the second user of the marked-to-market valuation for the second set of financial transaction data for the at least one transaction, a second set of financial transaction data for the at least one new financial transaction from the second user and comparing by the transaction processor the first set of financial transaction data for the at least one new financial transaction with the second set of financial transaction data for at the at least one new financial transaction to determine a collateral match decision for the at least one new financial transaction.

2. The method of claim 1, wherein said mark to market parameters comprise at least one of the following:
market values associated with a financial transaction; and
user specified decision criteria for valuing said financial transaction; and
user specified decision criteria for reconciling said financial transaction.

3. The method of claim 2, wherein said market values associated with said financial transaction comprise real-time, world-wide market values.

4. The method of claim 1, further comprising:
managing said financial transaction data;
auditing said financial transaction data upon submission by a user; and
administering said financial transaction data.

5. The method of claim 1, further comprising:
processing said financial transaction data using a mark to market processor.

6. The method of claim 1, further comprising:
processing said financial transaction data using a data conversion processor.

7. The method of claim 6, wherein processing the financial transaction data using said data conversion processor further comprises:
managing a data file from said user;
converting said data file to a standard file format;
parsing said data file;
validating said data file;
converting a data field to a standard data field format;
inserting a filler data field for empty-fixed data fields;
mapping a standardized, populated data field according to said user's preferences;
reconfiguring import specifications;
creating new import specifications;
reconfiguring export specifications;
creating new export specifications; and
logging errors.

8. The method of claim 1, further comprising:
processing said financial transaction data using a reconcilement processor.

9. The method of claim 8, wherein processing the financial transaction data using said reconcilement processor further comprises:
configuring updated data fields;
using one or more matching criteria to reconcile the financial transaction data for a set of parties associated with said financial transaction;
prioritizing said matching criteria for said set of parties associated with said financial transaction; and
using tie-breaker rules of said matching criteria for reconciling inexactly matched market valuations for said financial transaction data associated with said collateral match decision.

10. The method of claim 1, further comprising:
controlling a communications path for discussing said financial transaction data and one or more associated market valuations among multiple users.

11. A platform-independent system of collateral matching and mark to market reconcilement using a global communications network, comprising:
a transaction processor preprogrammed for receiving via the global communications network a first set of financial transaction data for at least one transaction from a first user and a second set of financial transaction data for the at least one transaction from a second user, wherein said financial transaction data comprises financial data and user instructional data,
the transaction processor being preprogrammed for comparing the first set of financial transaction data with the second set of financial transaction data to determine a collateral match decision for the at least one transaction;
the transaction processor being further preprogrammed for thereafter, iteratively receiving from the first user on succeeding periodic occasions a marked-to-market valuation for the first set of financial transaction data for the at least one transaction marked to market according to mark to market parameters for said first set of financial transaction data associated with said collateral match decision via the global communications network and iteratively receiving from the second user on each of said succeeding periodic occasions a marked-to-market valuation for the second set of financial transaction data for the at least one transaction marked to market according to mark to market parameters for said second set of financial transaction data associated with said collateral match decision via the global communications network;

said the transaction processor being additionally preprogrammed for reconciling on each of said succeeding periodic occasions the received marked-to-market valuation for the first set of financial transaction data for the at least one transaction marked to market according to the mark to market parameters for said first set of financial transaction data associated with said collateral matched decision to the received marked-to-market valuation for the second set of financial transaction data for the at least one transaction marked to market according to the mark to market parameters for said second set of financial transaction data associated with said collateral matched decision;

the transaction processor being preprogrammed for providing on each of said succeeding periodic occasions a netted value between the received mark-to-market valuation for the first set of financial transaction data for the at least one transaction marked to market according to the mark to market parameters for said first set of financial transaction data associated with said collateral matched decision and the received marked-to-market valuation for the second set of financial transaction data for the at least one transaction marked to market according to the mark to market parameters for said second set of financial transaction data associated with said collateral matched decision; and the transaction processor being further preprogrammed for receiving on at least one of said succeeding periodic occasions via the global communications network, simultaneously with receipt from the first user of the marked-to-market valuation for the first set of financial transaction data for the at least one transaction, a first set of financial transaction data for at least one new financial transaction from the first user and for receiving on said at least one of said succeeding periodic occasions via the global communications network, simultaneously with receipt from the second user of the marked-to-market valuation for the second set of financial transaction data for the at least one transaction, a second set of financial transaction data for the at least one new financial transaction from the second user and for comparing the first set of financial transaction data for the at least one new financial transaction with the second set of financial transaction data for at the at least one new financial transaction to determine a collateral match decision for the at least one new financial transaction.

12. The system of claim 11, wherein said mark to market parameters comprise at least one of the following:
   market values associated with a financial transaction; and
   user specified decision criteria for valuing said financial transaction; and
   user specified decision criteria for reconciling said financial transaction.

13. The system of claim 12, wherein said market values associated with said financial transaction comprise real-time, world-wide market values.

14. The system of claim 11, further comprising:
   means for managing said financial transaction data;
   means for auditing said financial transaction data upon submission by a user; and
   means for administering said financial transaction data.

15. The system of claim 11, further comprising:
   means for processing said financial transaction data using a mark to market processor.

16. The system of claim 11, further comprising:
   means for processing said financial transaction data using a data conversion processor.

17. The system of claim 16, wherein said data conversion processor comprises:
   means for managing a data file from said user;
   means for converting said data file to a standard file format;
   means for parsing said data file;
   means for validating said data file;
   means for converting a data field to a standard data field format;
   means for inserting a filler data field for empty-fixed data fields;
   means for mapping a standardized, populated data field according to said user's preferences;
   means for reconfiguring import specifications;
   means for creating new import specifications;
   means for reconfiguring export specifications;
   means for creating new export specifications; and
   means for logging errors.

18. The system of claim 11, further comprising:
   means for processing said financial transaction data using a reconcilement processor.

19. The system of claim 18, wherein said reconcilement processor comprises:
   means for configuring updated data fields;
   means for using one or more matching criteria to reconcile the financial transaction data for a set of parties associated with said financial transaction;
   means for prioritizing said matching criteria for said set of parties associated with said financial transaction; and
   means for using tie-breaker rules of said matching criteria for reconciling inexactly matched market valuations for said financial transaction data associated with said collateral match decision.

20. The system of claim 11, further comprising:
   means for controlling a communications path for discussing said financial transaction data and one or more associated market valuations among multiple users.

21. A platform-independent automated collateral matching and mark to market reconcilement method for creating, managing, verifying, and confirming matched financial transactions, comprising:
   displaying a user module for viewing, selecting, inputting, and transmitting transaction data from a user to a network collateral matching and reconcilement system,
   receiving by a transaction processor via the global communications network a first set of financial transaction data upon submission by a first user for at least one transaction and a second set of financial transaction data upon submission by a second user for the at least one transaction;
   thereafter translating said received transaction data upon submission by said user;
   authenticating said transaction data upon submission by said user;
   storing said transaction data upon submission by said user;
   comparing by the transaction processor the first set of financial transaction data with the second set of financial transaction data according to collateral matching parameters to determine a matching outcome for the at least one transaction;

thereafter iteratively receiving from the first user by the transaction processor on succeeding periodic occasions a marked-to-market valuation for the first set of financial transaction data for the at least one transaction marked to market according to mark to market parameters for said first set of financial transaction data associated with said collateral matching outcome via the global communications network and iteratively receiving from the second user on each of said succeeding periodic occasions a marked-to-market valuation for the second set of financial transaction data for the at least one transaction marked to market according to mark to market parameters for said second set of financial transaction data associated with said collateral matching outcome via the global communications network;

reconciling by the transaction processor on each of said succeeding periodic occasions the received marked-to-market valuation the first set of financial transaction data for the at least one transaction marked to market according to the mark to market parameters for said first set of financial transaction data associated with said collateral matching outcome to the received marked-to-market valuation for the second set of financial transaction data for the at least one transaction marked to market according to the mark to market parameters for said second set of financial transaction data associated with said collateral matching outcome;

providing by the transaction processor on each of said succeeding periodic occasions a netted value between the received mark-to-market valuation for the first set of financial transaction data for the at least one transaction marked to market according to the mark to market parameters for said first set of financial transaction data associated with said collateral matching outcome and the received marked-to-market valuation for the second set of financial transaction data for the at least one transaction marked to market according to the mark to market parameters for said second set of financial transaction data associated with said collateral matching outcome, and receiving by the transaction processor on at least one of said succeeding periodic occasions via the global communications network simultaneously with receipt from the first user of the marked-to-market valuation for the first set of financial transaction data for the at least one transaction, a first set of financial transaction data for at least one new financial transaction from the first user and receiving by the transaction processor on said at least one of said succeeding periodic occasions via the global communications network, simultaneously with receipt from the second user of the marked-to-market valuation for the second set of financial transaction data for the at least one transaction a second set of financial transaction data for the at least one new financial transaction from the second user and comparing by the transaction processor the first set of financial transaction data for the at least one new financial transaction with the second set of financial transaction data for at the at least one new financial transaction to determine a collateral matching outcome for the at least one new financial transaction.

22. The method of claim 21, further comprising:

auditing said transaction data upon submission by said user;

controlling a communications path for discussing said transaction data and said matching outcome among multiple users; and

23. A platform-independent automated collateral matching and mark to market reconcilement system for creating, managing, verifying, and confirming matched financial transactions, comprising:

a transaction processor preprogrammed for displaying a user module for viewing, selecting, inputting, and transmitting transaction data from a user to a network collateral matching and reconcilement system, said transaction processor being preprogrammed for receiving via the global communications network a first set of financial transaction data upon submission by a first user for at least one transaction and a second set of financial transaction data upon submission by a second user for the at least one transaction;

means for thereafter translating said received transaction data upon submission by said user;

means for authenticating said transaction data upon submission by said user;

means for storing said transaction data upon submission by said user;

said transaction processor being further preprogrammed for comparing the first set of financial transaction data with the second set of financial transaction data according to collateral matching parameters to determine a matching outcome for the at least one transaction;

said transaction processor being additionally preprogrammed for thereafter iteratively receiving from the first user on succeeding periodic occasions a marked-to-market valuation for the first set of financial transaction data for the at least one transaction marked to market according to mark to market parameters for said first set of financial transaction data associated with said collateral matching outcome via the global communications network and iteratively receiving from the second user on each of said succeeding periodic occasions a marked-to-market valuation for the second set of financial transaction data for the at least one transaction marked to market according to mark to market parameters for said second set of financial transaction data associated with said collateral matching outcome via the global communications network;

said transaction processor being preprogrammed for reconciling on each of said succeeding periodic occasions the received marked-to-market valuation for the first set of financial transaction data for the at least one transaction marked to market according to the mark to market parameters for said first set of financial transaction data associated with said collateral matching outcome to the received marked-to-market valuation for the second set of financial transaction data for the at least one transaction marked to market according to the mark to market parameters for said second set of financial transaction data associated with said collateral matching outcome;

said transaction processor being preprogrammed for providing on each of said succeeding periodic occasions a netted value between the received mark-to-market valuation for the first set of financial transaction data for the at least one transaction marked to market according to the mark to market parameters for said first set of financial transaction data associated with said collateral matching outcome and the received marked-to-market valuation for the second set of financial transaction data for the at least one transaction marked to market according to the mark to market parameters for said second set of financial transaction data associated with said collateral matching outcome; and said transaction processor being preprogrammed for receiving on at least one of said succeeding periodic occasions via the global communications network, simultaneously with receipt from the first user of the marked-to-market valuation for the first set of financial transaction data for the at least one transaction, a first set of financial transaction data for at least one new financial transaction from the first user and receiving by the transaction processor on said at least one of said succeeding periodic occasions via the global communications network, simultaneously with receipt from the second user of the marked-to-market valuation for the second set of financial transaction data for the at least one transaction, a second set of financial transaction data for the at least one new financial transaction from the second user and comparing by the transaction processor the first set of financial transaction data for the at least one new financial transaction with the second set of financial transaction data for at the at least one new financial transaction to determine a collateral matching outcome for the at least one new financial transaction.

24. The system of claim 23, further comprising:
means for auditing said transaction data upon submission by said user;
means for controlling a communications path for discussing said transaction data and said matching outcome among multiple users; and
means for generating useful reports.

25. A secure, platform-independent automated system for collateral matching and mark to market reconcilement, comprising:
a network automated collateral matching and mark to market reconcilement system coupled to at least one communications network having a plurality of users and adapted for receiving financial transaction data;
an interactive user module coupled with a network management system server connected to said communications network having a plurality of users;
a plurality of client terminals coupled to said interactive user module for user interaction with said network automated collateral matching and mark to market reconcilement system;
said network automated collateral matching and mark to market reconcilement system further comprising a transaction processor the transaction processor being preprogrammed for:
  receiving by the transaction processor via the global communications network a first set of financial transaction data for at least one transaction from a first user and a second set of financial transaction data for the at least one transaction from a second user, wherein said financial transaction data comprises financial data and user instructional data;
  comparing by the transaction processor the first set of financial transaction data with the second set of financial transaction data to determine a collateral match decision for the at least one transaction;
  thereafter, iteratively receiving from the first user by the transaction processor on succeeding periodic occasions a marked-to-market valuation for the first set of financial transaction data for the at least one transaction marked to market according to mark to market parameters for said first set of financial transaction data associated with said collateral match decision via the global communications network and iteratively receiving from the second user on each of said succeeding periodic occasions a marked-to-market valuation for the second set of financial transaction data for the at least one transaction marked to market according to mark to market parameters for said second set of financial transaction data associated with said collateral match decision via the global communications network;
  reconciling by the transaction processor on each of said succeeding periodic occasions the received marked-to-market valuation for the first set of financial transaction data for the at least one transaction marked to market according to the mark to market parameters for said first set of financial transaction data associated with said collateral matched decision to the received marked-to-market valuation for the second set of financial transaction data for the at least one transaction marked to market according to the mark to market parameters for said second set of financial transaction data associated with said collateral matched decision;
  providing by the transaction processor on each of said succeeding periodic occasions a netted value between the received mark-to-market valuation for the first set of financial transaction data for the at least one transaction marked to market according to the mark to market parameters for said first set of financial transaction data associated with said collateral matched decision and the received marked-to-market valuation for the second set of financial transaction data for the at least one transaction marked to market according to the mark to market parameters for said second set of financial transaction data associated with said collateral matched decision; and
  receiving by the transaction processor on at least one of said succeeding periodic occasions via the global communications network, simultaneously with receipt from the first user of the marked-to-market valuation for the first set of financial transaction data for the at least one transaction, a first set of financial transaction data for at least one new financial transaction from the first user and receiving by the transaction processor on said at least one of said succeeding periodic occasions via the global communications network, simultaneously with receipt from the second user of the marked-to-market valuation for the second set of financial transaction data for the at least one transaction, a second set of financial transaction data for the at least one new financial transaction from the second user and comparing by the transaction processor the first set of financial transaction data for the at least one new financial transaction with the second set of financial transaction data for at the at least one new financial transaction to determine a collateral match decision for the at least one new financial transaction.

26. The system of claim 25, wherein said interactive user module comprises an application that is downloaded from a web-page to said network automated collateral matching and mark to market reconcilement system.

27. The system of claim 25, wherein said interactive user module is communicated to said network automated collateral matching and mark to market reconcilement system by one of an internet, an intranet, or an extranet.

28. The system of claim 25, wherein said communications network is a financial institution's communications network.

* * * * *

UNITED STATES PATENT AND TRADEMARK OFFICE
CERTIFICATE OF CORRECTION

PATENT NO. : 7,599,877 B1
APPLICATION NO. : 09/627951
DATED : October 6, 2009
INVENTOR(S) : Alan Cole and Jon Cassell It is certified that error appears in the above-identified patent and that said Letters Patent is hereby corrected as shown below:

In Column 15, Line 15, please change "according to the mark to market parameters for said for" to -- according to the mark to market parameters for said --

In Column 15, Line 16, please change "said first set of financial transaction data associated with" to -- first set of financial transaction data associated with --

In Column 17, Line 10, please change "said the transaction processor being additionally prepro-" to -- the transaction processor being additionally prepro- --

Line 68 Please add -- generating useful reports -- to the end of Column 19 as the last line of Claim No. 22

Signed and Sealed this

Twenty-fourth Day of November, 2009

David J. Kappos
*Director of the United States Patent and Trademark Office*